(12) United States Patent
Hashimoto

(10) Patent No.: US 7,110,579 B2
(45) Date of Patent: Sep. 19, 2006

(54) IMAGE SYNTHESIZING APPARATUS WHICH SWITCHES BETWEEN A FIRST AND SECOND MODE OF READING DIFFERENT NUMBER OF PIXELS

(75) Inventor: Seiji Hashimoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 714 days.

(21) Appl. No.: 10/368,578

(22) Filed: Feb. 20, 2003

(65) Prior Publication Data

US 2003/0156744 A1   Aug. 21, 2003

(30) Foreign Application Priority Data

Feb. 22, 2000  (JP)  ............................. 2002/046475
Feb. 20, 2002  (JP)  ............................. 2002/043238
Feb. 22, 2002  (JP)  ............................. 2002/046473

(51) Int. Cl.
   G06K 9/36     (2006.01)
   G06K 9/00     (2006.01)

(52) U.S. Cl. ................. 382/124; 382/284; 382/278

(58) Field of Classification Search ................. 382/124
   See application file for complete search history.

(56) References Cited

U.S. PATENT DOCUMENTS 5,259,040 A * 11/1993 Hanna ..................... 382/107
6,289,114 B1 * 9/2001 Mainguet ................. 382/124
6,587,597 B1 * 7/2003 Nakao et al. ............. 382/284
6,754,368 B1 * 6/2004 Cohen ...................... 382/103

FOREIGN PATENT DOCUMENTS

EP   1 306 804   5/2003
JP    3198810    8/2001

OTHER PUBLICATIONS

Office Action, dated Dec. 1, 2004, in Korean Application No. 10-2003-0010552.

* cited by examiner

Primary Examiner—Joseph Mancuso
Assistant Examiner—Kathleen Yuan
(74) Attorney, Agent, or Firm—Fitzpatrick, Cella, Harper & Scinto

(57) ABSTRACT

An image input apparatus for sequentially obtaining a plurality of partial images which are portions of an image of an object, by relatively moving the object and a sensor having a plurality of pixel circuit units, including a drive circuit which effects control so as to store photoelectric charge en bloc at photoelectric conversion units respectively included in the plurality of pixel circuit units, then blanket-transfer optical signals of the photoelectric conversion units respectively in the plurality of pixels to memory units included in the corresponding pixel circuit units, and then read the photoelectric signals, and noise signals generated in the pixel circuit units in this order from the pixel circuit units.

1 Claim, 19 Drawing Sheets

READING AREA
FINGER
10

FINGER
1
10

IMAGE SYNTHESIZING APPARATUS WHICH SWITCHES BETWEEN A FIRST AND SECOND MODE OF READING DIFFERENT NUMBER OF PIXELS

BACKGROUND OF THE INVENTION

1. Field of the Invention

The present invention relates to an image input apparatus and a fingerprint recognition apparatus for recognizing characters or images of originals, barcodes, fingerprints etc.

2. Related Background Art

Conventionally, as an image input apparatus for recognizing characters or images of originals, barcodes etc., there is an apparatus of a constitution for reading images by moving a hand scanner or the like on an original or the like. This constitution enables the apparatus to be miniaturized and made portable. However, a hand-feeding speed of the hand scanner may be changed to distort images.

Additionally, there is an image input apparatus for authenticating a fingerprint by bringing a finger into direct contact with a two-dimensional semiconductor sensor (electrostatic type, optical reading type or the like) to read a fingerprint. Recently, such a fingerprint sensor has attracted attention in terms of an increase of security for corporations or individuals. Moreover, in E commerce or the like utilizing cell phones or portable devices, great market expansion can be expected if the fingerprint sensor is miniaturized and reduced in weight and cost. In the case of the current fingerprint sensor, however, a sensor size is inevitably increased because the sensor is constituted in size equal to a size of a finger.

Since a price of a semiconductor is uniquely determined by a wafer yield, a large size leads to a high price, and there is a cost problem if it is mounted on the cell phone. Besides, a large fingerprint sensor is not suitable for a compact portable device. Accordingly, it is advantageous in cost and shape if the sensor is miniaturized. As a solution, if the optical reading type is employed and an optical sensor is constituted of a line sensor, the sensor can be miniaturized. In this case, however, since it is necessary to relatively move the line sensor and the finger to read the fingerprint, as in the case of the image reading by the hand scanner, a read fingerprint image is distorted to greatly reduce authentication accuracy.

Thus, there is Japanese Patent No. 3,198,810 as an example of a well-known conventional technique to improve the aforementioned drawback. According to this Patent, a hand feeding speed during character reading of an original is discriminated, and a result of the discrimination is fed back to timing generation means, whereby image distortion is corrected.

The technology disclosed in the Patent No. 3198810 may enable authentication of an image at low resolution if the original or the hand is fed carefully or slowly in original reading. However, the technology cannot be used for the fingerprint sensor or the like which needs high resolution and high authentication accuracy.

SUMMARY OF THE INVENTION

An object of the present invention is to provide an image input apparatus for achieving high reproducibility of read images by an area sensor of a relatively small number of pixel lines.

In order to achieve the foregoing object, according to an aspect of the present invention, there is provided an image input apparatus for sequentially obtaining a plurality of partial images which are portions of an image of an object, by relatively moving the object and a sensor having a plurality of pixel circuit units, comprising a drive circuit which effects control so as to accumulate photoelectric charge en bloc in photoelectric conversion units respectively included in the plurality of pixel circuit units, then blanket-transfer photoelectric signals of the photoelectric conversion units respectively included in the plurality of pixels to memory units included in the corresponding pixel circuit units, and then read the photoelectric signals, and noise signals generated in the pixel circuit units in this order from the pixel circuit units.

According to an another aspect of the present invention, there is provided an image input apparatus comprising: a sensor including a plurality of pixels; a switch circuit which switches between a first reading mode for reading images from the plurality of pixels of the sensor and a second mode for reading images from a plurality of pixels smaller in number than the pixels used by the first mode; and a detection circuit which detects whether or not there is an object on the sensor, using the second reading mode, wherein in case that the presence of object on the sensor is detected by the detection circuit, the process is switched to the first reading mode.

According to an another, aspect of the present invention, there is provided an image input apparatus comprising: a sensor including a plurality of pixels; a switch circuit which switches between a first reading mode for reading images from the plurality of pixels of the sensor and a second mode for reading images from a plurality of pixels smaller in number than the pixels used by the first mode; and a detection circuit which detects relative movements of the sensor and an object using the second reading mode, wherein in case that the relative movements is detected by the detection circuit, the process is switched to the first reading mode.

According to an still another aspect of the present invention, there is provided an image input apparatus for sequentially obtaining a plurality of partial images which are portions of an image of an object, by relatively moving the object and a sensor having a plurality of pixels, comprising a control circuit which controls a timing of obtaining data of the plurality of partial images to be synthesized, on the basis of comparison of the data of the plurality of partial images.

Other objects and features of the present invention will become apparent upon reading of the following detailed description and drawings.

DESCRIPTION OF THE PREFERRED EMBODIMENTS

Next, the preferred embodiments of the present invention will be described by referring to the accompanying drawings. The description will be made mainly by way of a fingerprint reading example which needs particularly high-accuracy image reproduction. However, the present invention is not limited to this example and, needless to say, it can be applied to reading of originals or barcodes. Moreover, though a finger which becomes an object is moved with respect to a sensor in the embodiment, the sensor may be moved with respect to the object instead.

A first embodiment will be described.

Figure 2A:
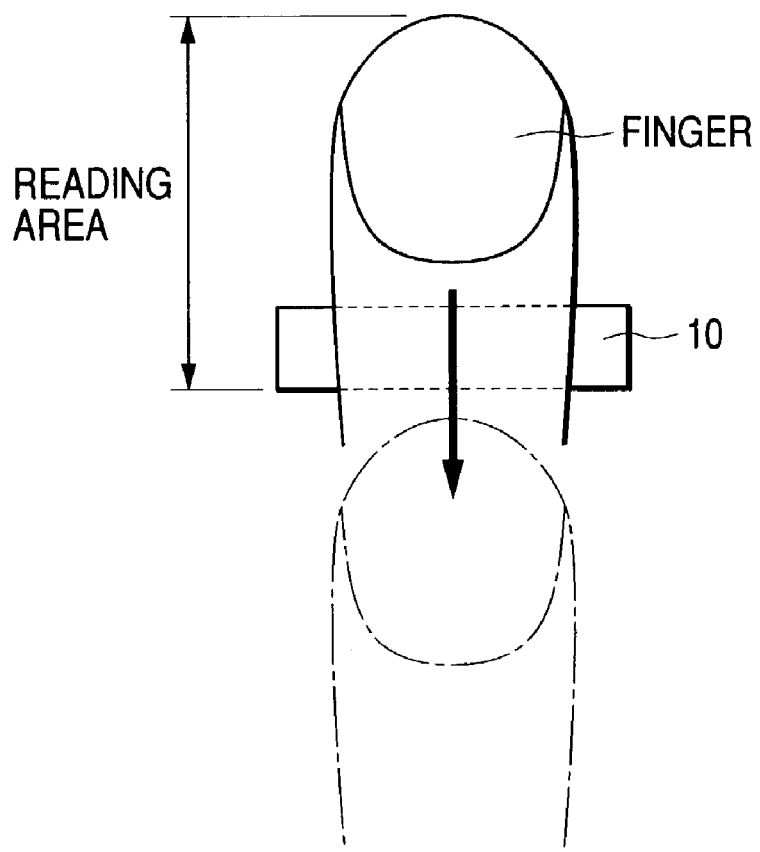
FIG. 2A is a view schematically showing movements of a sensor and a finger.
Figure 2B:
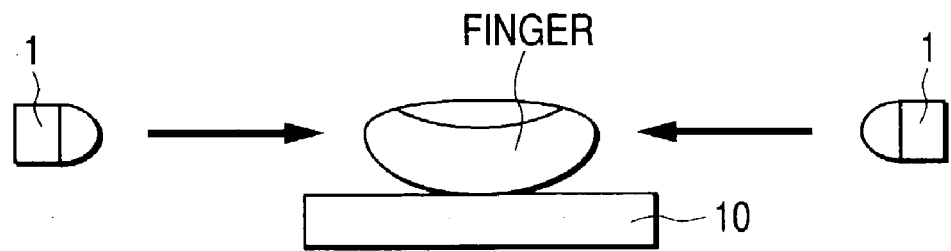
FIG. 2B is a view schematically showing a constitution of an optical fingerprint reader.

FIG. 2A schematically shows movements of a sensor and a finger. FIG. 2B schematically shows a constitution of an optical fingerprint reader. According to the embodiment, a sensor 10 of 540 horizontal pixels and 20 vertical pixels is used. For example, in the case of carrying out fingerprint authentication, since about 500 vertical pixels are normally used, a size of the sensor used in the embodiment is very small in comparison. Incidentally, in the embodiment, since an entire image is not read by the sensor but a portion of the image is read, the number of vertical pixels may be set only to be sufficient for reading a portion of the image. The finger is arranged on the sensor 10 (protective member such as a thin plate glass or a fiber plate is arranged on the sensor 10 when necessary) and, in the embodiment, as shown in FIG. 2A, the finger is moved in a direction vertical to a longitudinal direction of the sensor 10 (indicated by an arrow in FIG. 2A) to sequentially read images.

As shown in FIG. 2B, light is radiated from a LED 1 which serves as light irradiation means, on a side portion of the finger (it may be from an upper direction, an upper oblique direction, a lower direction or a lower oblique direction but preferably from the side portion in order to miniaturize an apparatus). Then the light is scattered/transmitted through the finger, and made incident from the finger on the sensor 10 to obtain a fingerprint image.

Figure 1:
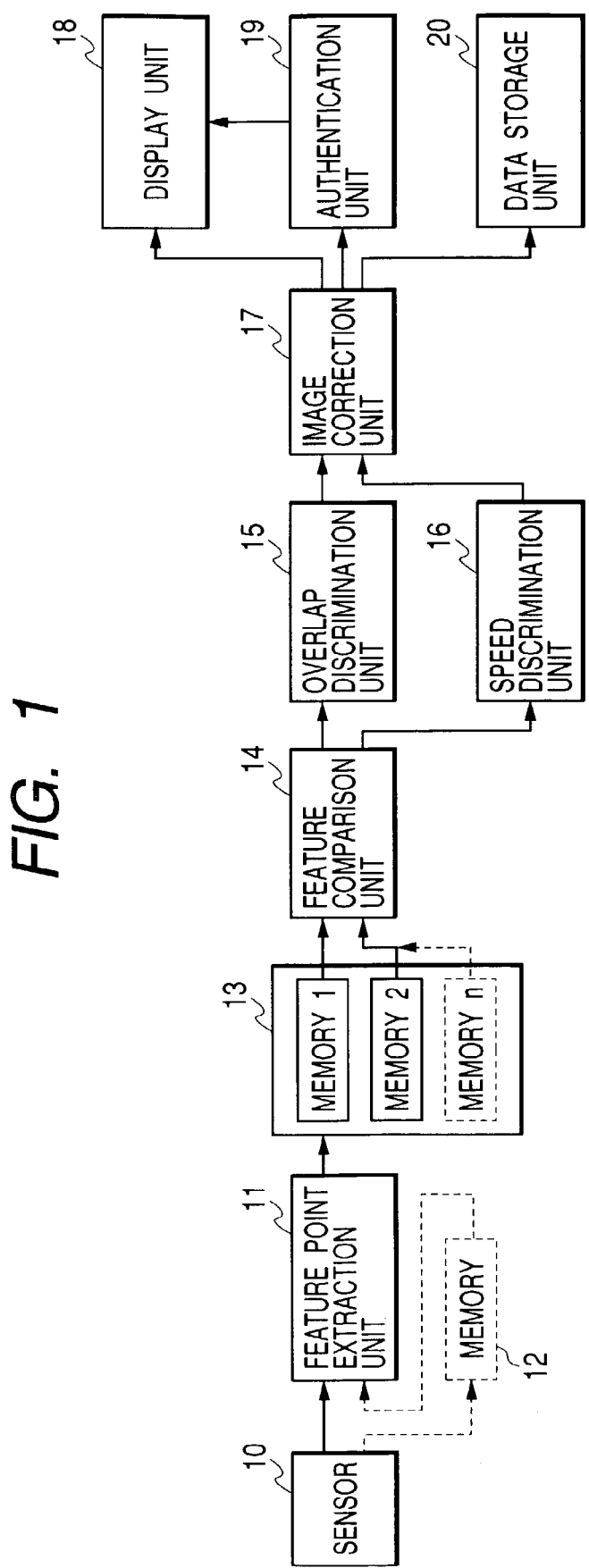
FIG. 1 is a system view of an image input apparatus according to an embodiment of the present invention.

FIG. 1 is a system view of an image input apparatus according to the first embodiment of the present invention. The sensor 10 sequentially outputs picked-up images of portions of a finger. There are overlap portions in the portions of the image respectively read by the sensor 10. As a moving speed of the finger slows down, a ratio of overlap portions is increased. The sensor 10 is controlled to be driven by a not-shown drive circuit.

An image signal from the sensor 10 is temporarily stored in a memory 12 or directly inputted to a feature point extraction unit 11, and then feature points of the portions of the image of the finger are extracted. The feature point extraction will be separately described later. The feature points are stored in a memory 13 for every desired pixel lines for each frame. For example, a 1st frame is written in a memory area 1, a 2nd frame in a memory area 2, . . . , an n-th frame in a memory area n. The feature points of the respective frames are compared with one another at a feature point comparison unit 14, and a moving speed or a speed change of the finger in a position of a pixel line in which the feature points coincide with each other is calculated by a speed discrimination unit 16. Simultaneously, image overlapping between the frames, i.e., an image overlap area, is determined by an overlap determination unit 15, modification (correction) is made at an image correction unit (image synthesis unit) 17 to prevent image overlapping, and the image is displayed by a display unit 18. The image is stored in a data storage unit 20 in case of registration. In case of authentication, the image is compared with data stored in an authentication unit 19, and displayed by the display unit 18 together with the corrected image of the finger an authentication result indicated by fingerprint coincidence/noncoincidence. In the case of noncoincidence, the finger is moved again. In the case of coincidence, the process proceeds to a purpose of the device (e.g., use of a cell phone is permitted to enable calling).

There are three general methods for feature point extraction. They are a method of extracting fingerprint features (end points or branch points) such as a downward line structure from a fingerprint image (e.g., Marshal relation method), an image (pattern) matching method of evaluating a degree of image similarity, and a frequency analysis method of subdividing a fingerprint image into smaller parts in a horizontal direction (direction vertical to a finger longitudinal direction) and frequency-analyzing downward line gradation difference among the images.

Figure 3:
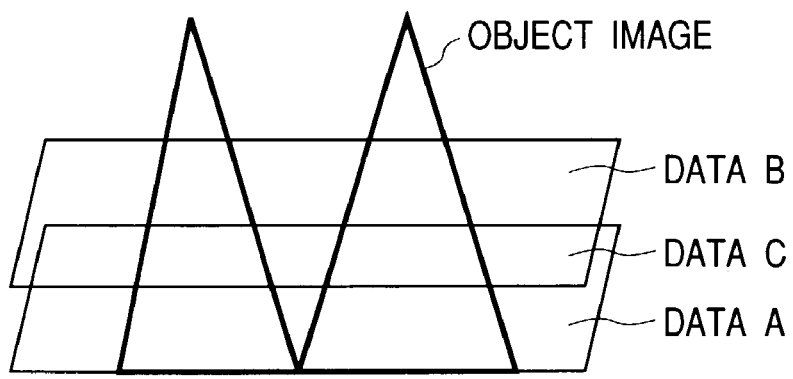
FIG. 3 is a schematic view showing image data when a character of an "M" shape to be recognized relatively easily is an object image.

FIG. 3 is a schematic view showing image data when a character of an "M" shape to be recognized relatively easily is an object image. Data A is image data of the object image at time t1, data B is image data of the object image at time of t2 (>t1), and data C is image data of an overlap portion. The image data of the data A is compared with the image data of the data B to recognize the data C of the image overlap portion and correct the data so as to be image data of the object image of the "M" shape.

As shown in the schematic view of FIG. 3, in the case of an object image which shape is recognized relatively easily, the image matching method of evaluating a degree of image similarity is preferred as a method of comparing the features of the data A and B with each other. If an image is complex as in the case of a fingerprint and portions of a fingerprint are compared with each other, the processing by the frequency analysis method is relatively easy. For the Marshal relation method, a somewhat large sensor area is preferred in order to detect end points or branch points of the downward line.

Figure 4:
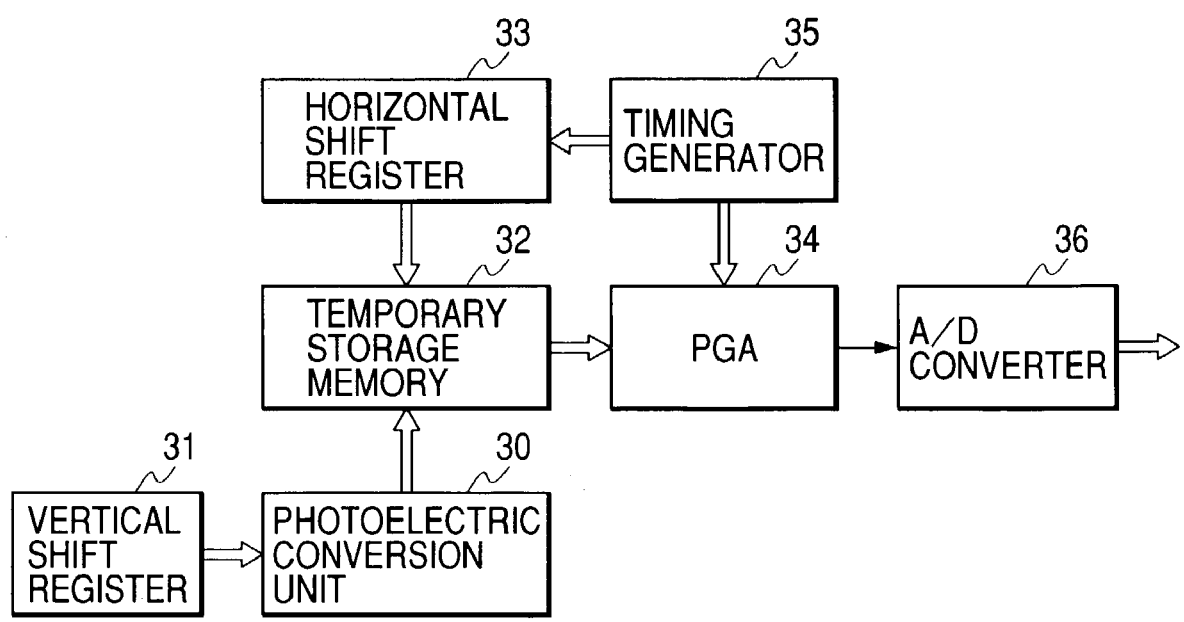
FIG. 4 is a view showing a circuit block of the sensor.
Figure 5:
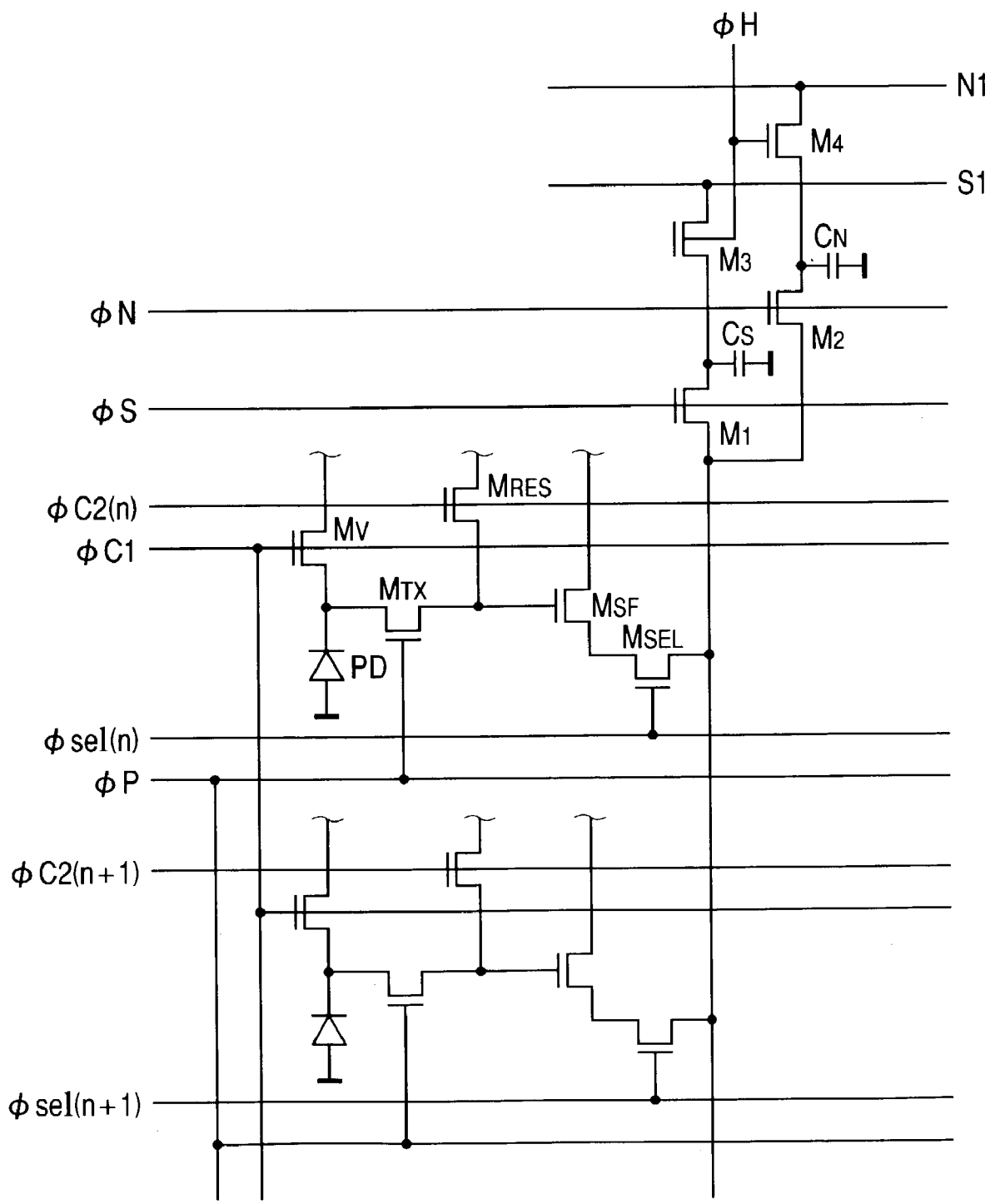
FIG. 5 is a view showing a sensor pixel portion.

FIGS. 4 and 5 show a constitutional example of the sensor 10. FIG. 4 shows a circuit block of the sensor, and FIG. 5 shows a sensor pixel portion.

In FIG. 4, a reference numeral 30 denotes a photoelectric conversion unit for reading images, 31 a vertical shift register for selecting a scanning line of the photoelectric conversion unit 30, 32 a temporary storage memory for temporarily storing a signal from the photoelectric conversion unit 30, and 33 a horizontal shift register for transferring and controlling a signal from the temporary storage memory 32 to a differential amplifier and a gain variable amplifier (PGA) 34 of a rear stage. A signal from the PGA 34 is converted into a digital signal by an analog/digital converter (A/D converter) 36 and guided to the feature extraction unit 11 of the rear stage shown in FIG. 1. The vertical shift register 31, the temporary storage memory 32, the horizontal shift register 33, the PGA 34 and the A/D converter 36 are controlled by control signals from a timing generator 35.

Next, constitutions of the photoelectric conversion unit 30 and the temporary storage memory 32 shown in FIG. 4 will be described by referring to FIG. 5. The photoelectric conversion unit used herein is constituted of a pixel amplifier system called a CMOS sensor. Each pixel has six elements. That is, one pixel is constituted of a photodiode PD, a reset switch $M_V$ for removing residual charge of the photodiode PD, a transfer switch $M_{TX}$ for transferring signal charge of the photodiode PD to the amplifier of the rear stage, a reset switch $M_{RES}$ for removing residual charge of a gate portion of the amplifier (buffer transistor), a buffer transistor $M_{SF}$ which serves as an amplifier for buffering signal voltage of the gate portion, and a switch $M_{SEL}$ for outputting and controlling a signal of the buffer transistor $M_{SF}$ to a vertical signal line. $M_1$ and $M_2$ denote switches for transferring signals from the vertical signal line to temporary storage capacities $C_S$, $C_N$. $M_3$ and $M_4$ denote switches for transferring a signal $S_1$ and noise $N_1$ from the capacities $C_S$, $C_N$ through a horizontal output line to the next differential amplifier (not shown). The reset switches $M_V$, $M_{RES}$ for blanket resetting and the transfer switch $M_{TX}$ for blanket transferring correspond to all pixel blanket exposure means. An all pixel blanket exposure period is from resetting of all pixels to the end of signal transferring by the transfer switch $M_{TX}$. In this period, a fingerprint image of a finger can be obtained by lighting the LED 1.

The signal of the photodiode PD is transferred to the capacity $C_S$, and the reset noise of the pixel amplifier (buffer transistor $M_{SF}$) is transferred to the capacity $C_N$.

An operation timing of the sensor will be described by referring to FIG. 6.

Figure 6:
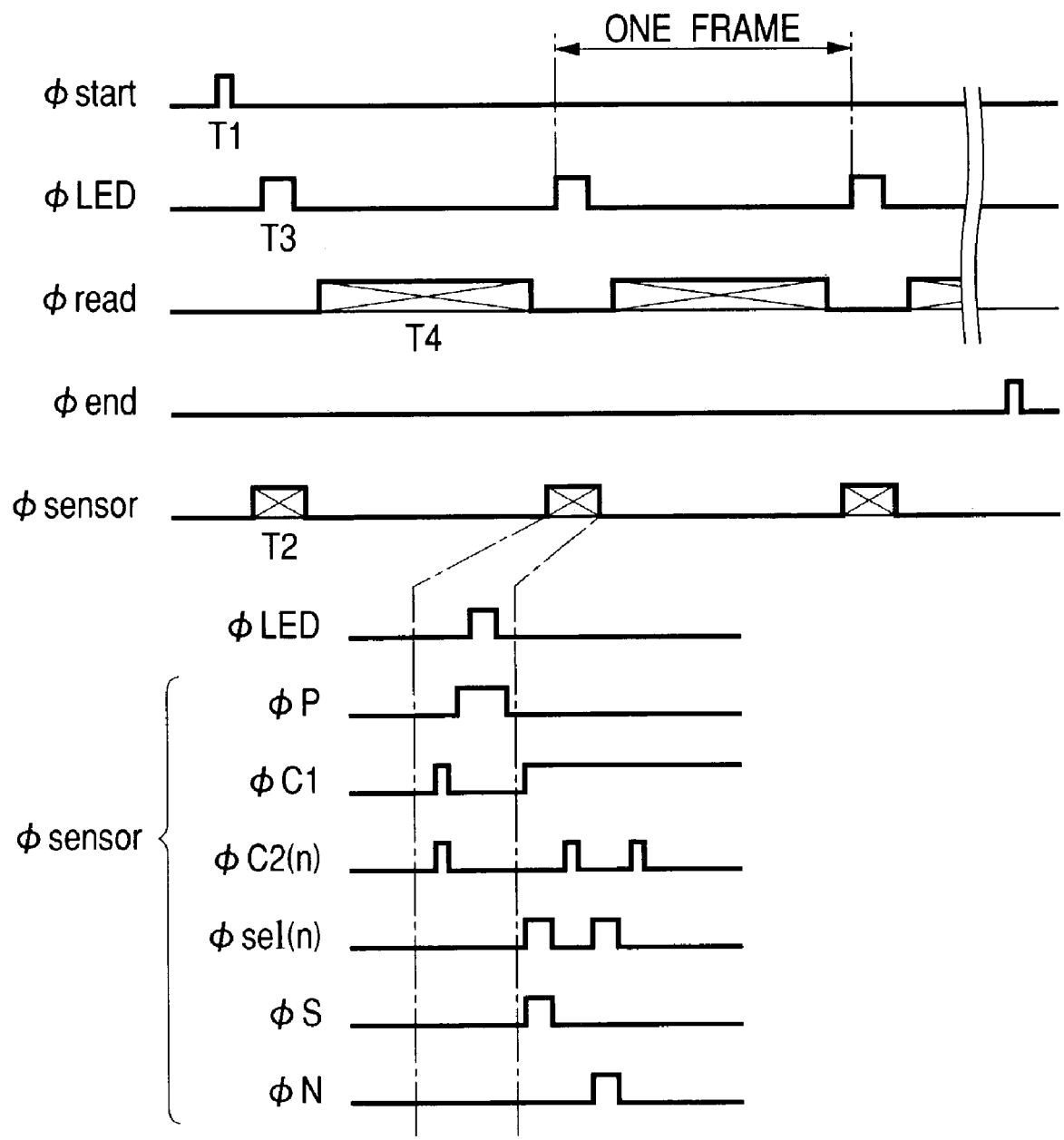
FIG. 6 is a timing chart showing an operation timing of the sensor.

A basic driving timing of FIG. 6 is that after all the pixels of the sensor are fully blanket-cleared, the LED 1 shown in FIG. 2B is lit to read portions of the fingerprint. Signals thereof are fully blanket-transferred to the amplifier gate portion (gate portion of the buffer transistor $M_{SF}$) of each pixel. The signal of the gate portion is transferred to the capacity $C_S$ on an each line basis to be stored. Then, the gate portion is reset, and its noise is stored in the capacity $C_N$. The signal and the noise are simultaneously transferred to the differential amplifier of the rear stage, where the noise is removed from the signal. This operation is repeated for each line.

The aforementioned operation will be described more in detail by referring to FIG. 6. First, when the finger on the sensor 10 is detected, an operation of the sensor is started in a period T1, and a control signal φstart is outputted from the timing generator 35. The vertical shift register 31 which has received the control signal φstart, first sets signals $\phi_{C1}$, $\phi_{C2(n)}$, $\phi_{C2(n+1)}$, . . . to H levels in a period T2, and turns ON the switches $M_V$, $M_{RES}$ to clear the photodiode PD and the gate portion of the amplifier (gate portion of the buffer transistor $M_{SF}$) at all the pixels. Then, a signal $\phi_P$ is set to an H level simultaneously at all the pixels, and the transfer switch $M_{TX}$ is turned ON. At this time, the LED 1 is lit ($\phi_{LED}$ is at an H level) to irradiate the moving finger with light. Reflected light from the finger is subjected to photoelectric conversion at the photodiode PD of each pixel, and a signal from the photodiode PD is transferred to the gate portion of the amplifier (gate portion of the buffer transistor $M_{SF}$). Accordingly, the finger image is read by an amount equivalent to twenty lines. Incidentally, in the OFF state of the transfer switch $M_{TX}$, the LED 1 may be lit for a period T3, and then the transfer switch $M_{TX}$ may be turned ON to transfer the signal. In the lit period of the LED 1 (light irradiation period), control is carried out so as to coincide with an exposure period of the all pixel blanket exposure means or to be within the exposure period, whereby consumption of power can be reduced. An output signal of the amplifier is stored in the capacity $C_S$ by setting signals $\phi_{sel(n)}$ and $\phi_S$ to H levels, and turning ON the switches $M_{SEL}$ and $M_1$.

Then, a signal $\phi_{C2(n)}$ is set to an H level, and the switch $M_{RES}$ is turned ON to reset the gate portion of the amplifier (gate portion of the buffer transistor $M_{SF}$) Then, the signals $\phi_{sel(n)}$ and $\phi_N$ are set to H levels, and the switches $M_{SEL}$ and $M_2$ are turned ON to transfer reset noise to the capacity $C_N$. At this time, in order to prevent leakage of charge to the gate portion by charge excess due to external light, the photodiode PD is controlled to a fixed potential by setting the signal $\phi_{C1}$ to an H level and turning ON the switch $M_V$. The signal and the noise stored in the capacities $C_S$, $C_N$ are sequentially transferred to the rear stage to be processed. After the sequential reading of the signals and the noise of the pixel of the n-th line for each row, an output signal of the amplifier of the pixel of a next n+1-th line is transferred to the capacity $C_S$, reset noise is transferred to the capacity $C_N$, and a reading operation is carried out to process transfer to the rear stage. In this way, reading of each pixel line is carried out. A period T4 is for reading all the pixel signals to the rear stage. When absence of the finger on the sensor 10 is detected, a signal φend is outputted from the timing generator 35, and the operation of the sensor is stopped.

In the described case, a method of setting time of reading all the pixels is important. That is, it is necessary to determine a frame speed of the sensor by predicting a highest moving speed of the finger or setting it by assumption. If a frame speed is low, the fingerprint may be blurred by the movement of the finger. Alternatively, if a frame speed is too high, more image memories must be prepared in the case of a slower finger movement.

According to the embodiment, a pixel size is set to 30 µm angle, and a highest moving speed of the finger is set to 1 cm/0.1 sec. Then, if LED lighting time is 28 µsec, the movement of the finger in this. period is 2.8 µm, and image blurring or a sampling error between the frames is 1/10 or lower of a maximum pixel size. Assuming that image overlapping is equivalent to minimum five pixels, the process is repeated for about 1.4 msec at 150 µm, and thus a frame rate is about 714 frames/sec. As a ϕread period is about 1.4 msec., a signal output frequency is about 8 MHz. If the LED lighting period is further shortened, an image sampling error can be reduced, and fingerprint reproducibility after image synthesis is high, whereby authentication accuracy can be increased.

If the sensor is driven based on the foregoing as an assumption to enable later-described image synthesis, it is possible to carry out satisfactory authentication even if the feature point extraction method is any one of the frequency analysis method, the image matching method and the relation method. It is only necessary to set a feature point extraction method or a frame speed in accordance with a purpose (necessary authentication accuracy).

As a method for detecting the fingerprint, in addition to the optical system for irradiating the finger with light and detecting the fingerprint by the optical sensor based on its reflected light or transmitted light (or scattered/transmitted light), there is a semiconductor sensor system for detecting the fingerprint by placing the finger on a semiconductor sensor such as a piezoelectric element, a capacitance detection element, a temperature detection element or the like, and detecting a pressure, a capacity, a temperature or the like. According to the present invention, any detection method can be used. However, since an image is picked up so that portions of a dynamic image are overlapped in the invention, the sensor 10 must have a faster reading speed compared with the finger moving speed.

According to the embodiment described above, as the compact sensor is used, costs can be reduced and miniaturization is possible. Moreover, power consumption can be reduced, high accuracy authentication can be carried out, and thus the apparatus can be applied to portable devices.

A second embodiment will be described.

Figure 8A:
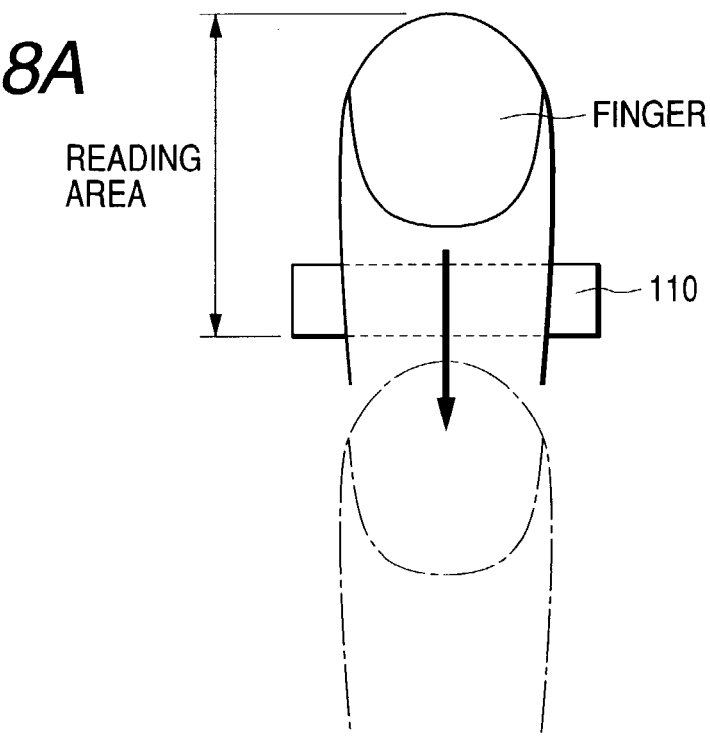
FIG. 8A is a view schematically showing movements of a sensor and a finger.
Figure 8B:
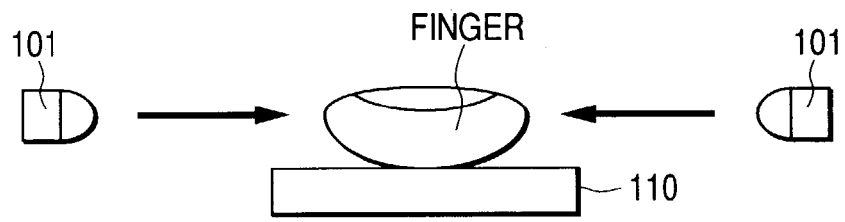
FIG. 8B is a view schematically showing a constitution of an optical fingerprint reader.

FIG. 8A schematically shows movements of a sensor and a finger. FIG. 8B schematically shows a constitution of an optical fingerprint reader. According to the embodiment, a sensor 110 of 540 horizontal pixels and 20 vertical pixels is used. For example, in the case of carrying out fingerprint authentication, since about 500 vertical pixels are normally used, a size of the sensor used in the embodiment is very small in comparison. Incidentally, in the embodiment, since an entire image is not read by the sensor but a portion of the image is read, the number of vertical pixels may be set only to be sufficient for reading a portion of the image. The finger is arranged on the sensor 110 (protective member such as a thin plate glass or a fiber plate is arranged on the sensor 110 when necessary) and, in the present embodiment, as shown in FIG. 8A, the finger is moved in a direction vertical to a longitudinal direction of the sensor 110 (indicated by an arrow in FIG. 8A) to sequentially read images.

As shown in FIG. 8B, light is radiated from a LED 1 which serves as light irradiation means on a side portion of the finger (it may be from an upper direction, an upper oblique direction, a lower direction or a lower oblique direction but preferably from the side portion in order to miniaturize an apparatus). Then the light is scattered/transmitted through the finger, and made incident from the finger on the sensor 110 to obtain a fingerprint image.

Figure 9:
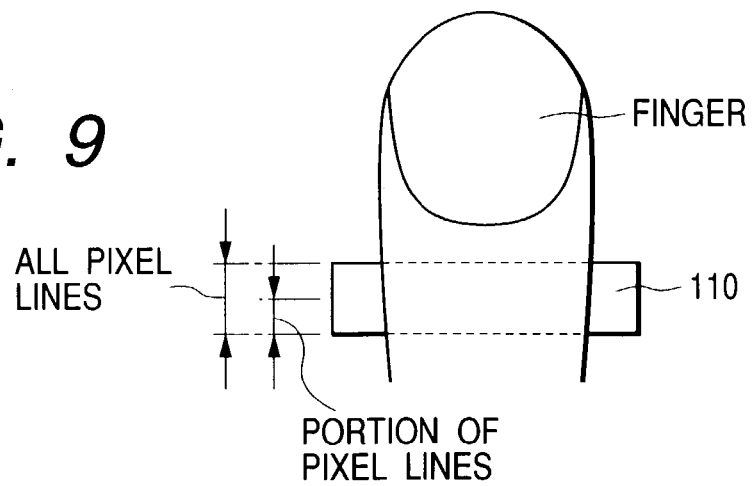
FIG. 9 is a view explaining a reading operation of a portion of pixel lines in a sensor.

According to the present embodiment, prior to reading of the fingerprint image by the finger moving operation described above with reference to FIGS. 8A and 8B, as shown in FIG. 9, a signal is read by not using all the pixels lines (twenty lines) of the sensor 110 but using portions of a plurality of pixel lines, and presence or absence of the finger on the sensor 110 is determined. After the arrangement of the finger on the sensor 110 is confirmed, the process enters reading of the fingerprint image by the finger moving operation using all the pixel lines of the sensor 110. This constitution enables low power consumption of the system since not all the pixel lines are scanned in determination of the presence of the finger.

Figure 7:
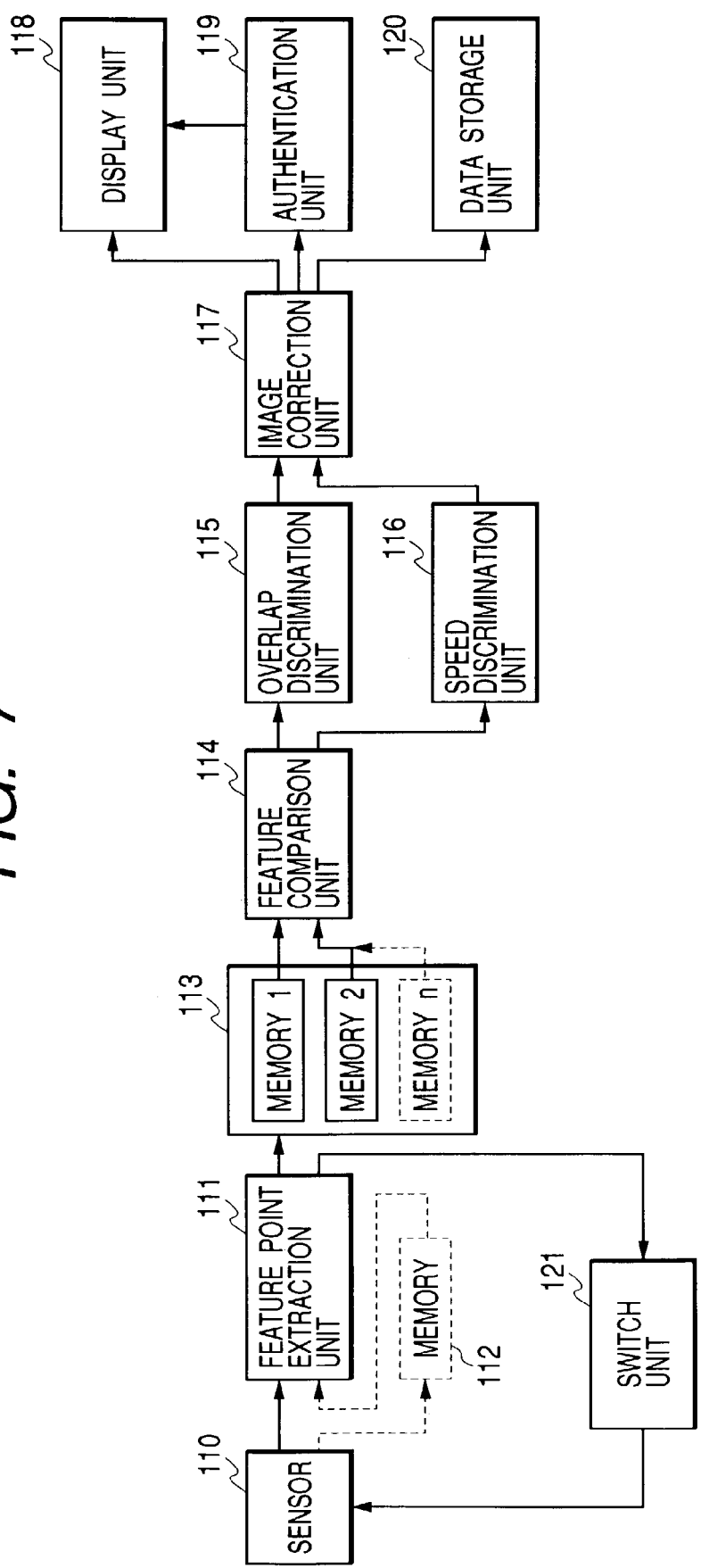
FIG. 7 is a system view of an image input apparatus according to another embodiment of the present invention.

FIG. 7 is a system view of an image input apparatus according to the second embodiment of the present invention. First, as shown in FIG. 9, a signal is read by using a portion of the plurality of pixel lines of the sensor 110, and whether or not there is the finger on the sensor 110 is determined. That is, a portion of the plurality of pixel lines of the sensor 110 shown in FIG. 9 is repeatedly driven to obtain data A1, data A2, data A3, . . . (each data indicates output data from the portion of the plurality of pixel lines). These data are inputted through a memory 112 or directly to a feature point extraction unit 111. When a change from an nonextracted state of finger feature points (finger is not arranged) to an extracted state of finger feature points (finger is arranged) is detected at the feature point extraction unit 111, the feature point extraction unit 111 sends a switch signal to a switch unit 121. The switch signal 121 outputs to the sensor 110 a signal instructing a start of fingerprint image reading by a finger moving operation using all the pixel lines shown in FIG. 8A.

After the presence of the finger on the sensor 110 is confirmed and the finger is moved, the sensor 110 sequentially outputs portions of a picked-up image by using all the pixel lines. There are overlap portions in the portions of the image respectively read by the sensor 110. As a moving speed of the finger slows down, a ratio of overlap portions is increased.

An image signal from the sensor 110 is temporarily stored in the memory 112 or directly inputted to the feature point extraction unit 111, and then feature points of the portions of the image of the finger are extracted. The feature point extraction will be separately described later. The feature points are stored in a memory 113 on desired pixel line basis for each frame. For example, a 1st frame is written in a memory area 1, a 2nd frame in a memory area 2, . . . , an n-th frame in a memory area n. The feature points of the respective frames are compared with one another at a feature point comparison unit 114, and a moving speed of the finger in a position of a pixel line in which the feature points coincide with each other is calculated by a speed discrimination unit 116. Simultaneously, image overlapping between the frames, i.e., an image overlap area, is determined by an overlap determination unit 115, modification (correction) is made to prevent image overlapping at an image correction unit (image synthesis unit) 117, and the image is displayed by a display unit 118. The image is stored in a data storage unit 120 in registration. In case of authentication, the image is compared with data stored in an authentication unit 119, and displayed by the display unit 118 together with the corrected image of the finger an authentication result indicated by fingerprint coincidence/noncoincidence. In the case of noncoincidence, the finger is moved again. In the case of coincidence, the process proceeds to a purpose of the device (e.g., use of a cell phone is permitted to enable calling).

There are three general methods for feature point extraction. They are a method of extracting fingerprint features (end points or branch points) such as a downward line structure from a fingerprint image (e.g., Marshal relation method), an image (pattern) matching method of evaluating a degree of image similarity, and a frequency analysis method of subdividing a fingerprint image into smaller parts in a horizontal direction (direction vertical to a finger longitudinal direction) and frequency-analyzing downward line gradation difference among the images.

In the described case, the same feature point extraction unit 111 is used for extracting the feature points of the partial picked-up image of the finger using the portion of the plurality of pixel lines and extracting the feature points of the partial picked-up image of the finger using all the pixel lines. However, feature point extraction units may be separately installed, and feature point extraction methods may be changed. For example, feature point extraction can be carried out by the image (pattern) matching method in the case of using a portion of the plurality of pixel lines, and by the frequency analysis method in the case of using all the pixel lines.

Figure 10:
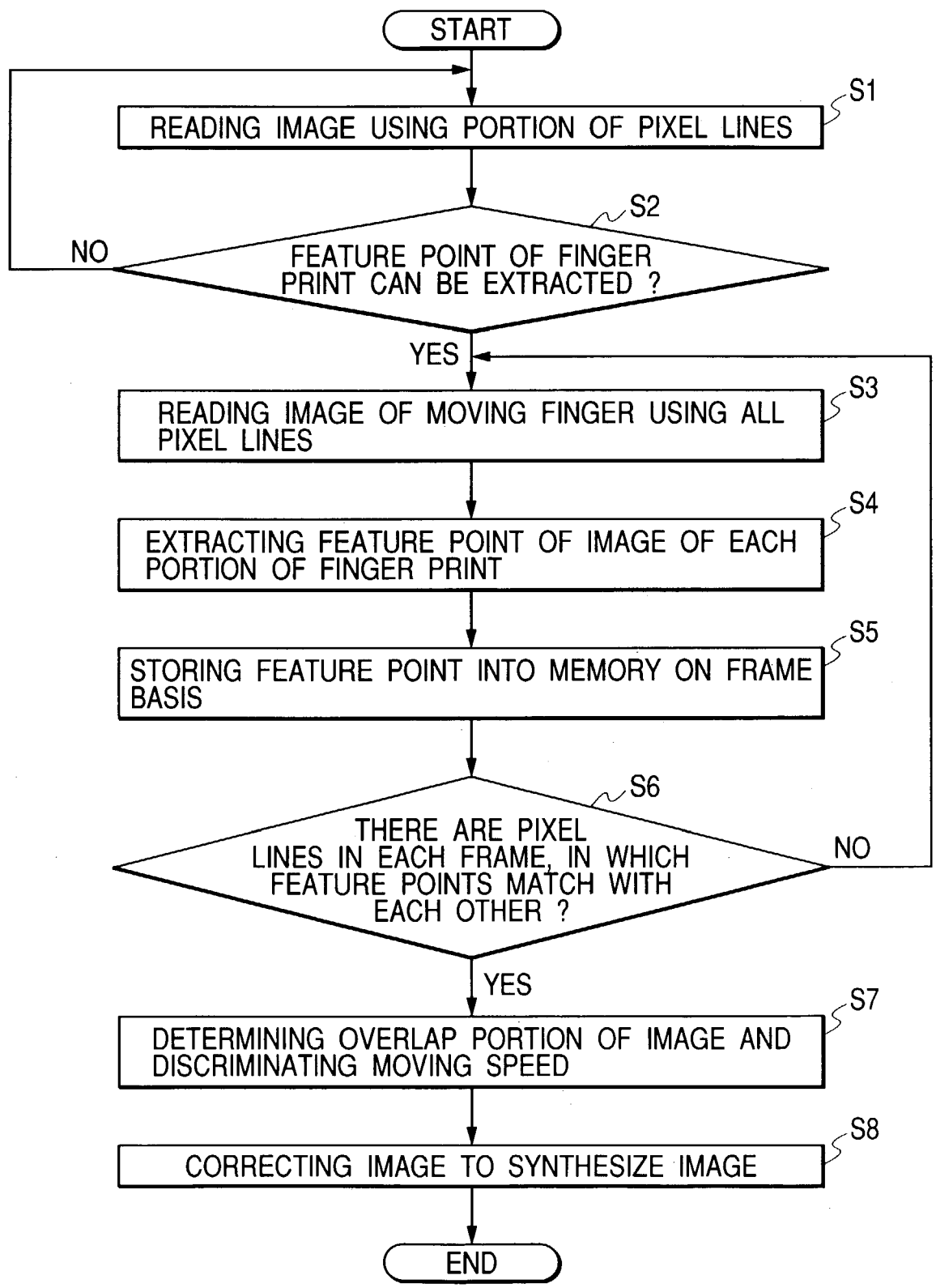
FIG. 10 is a flowchart explaining an image input operation.

FIG. 10 is a flowchart showing the image input operation. For such an operation, a program may be prepared to carry out the operation by software. That is, first, a signal is read by using a portion of the plurality of pixel lines of the sensor 110 (step S1), and whether or not there is the finger on the sensor 110 is determined based on whether the feature points of the fingerprint can be extracted or not (step S2). If the feature points of the fingerprint can be extracted, a fingerprint image is reads by a finger moving operation using all the pixel lines (step S3). On the other hand, if the feature points of the fingerprint cannot be extracted, the signal is read again by using the portion of the plurality of pixel lines of the sensor 110.

For the portions of the finger image read by the sensor 110, the feature points of the portions of the finger image are extracted (step S4). The feature points are stored in the memory 113 on desired pixel line basis for each frame (step S5). The feature points of the respective frames are compared with one another (step S6). If more than a predetermined number of feature points coincide with one another, a finger moving speed in a position of the pixel line where the feature points are coincident is calculated, and simultaneously image overlapping between the frames, i.e., an image overlap area, is decided (step S7). Then, modification (correction) is made so as to prevent image overlapping (step S8). If the feature points do not coincide with one another, the fingerprint image is read again by the finger moving operation using all the pixel lines.

Figure 11:
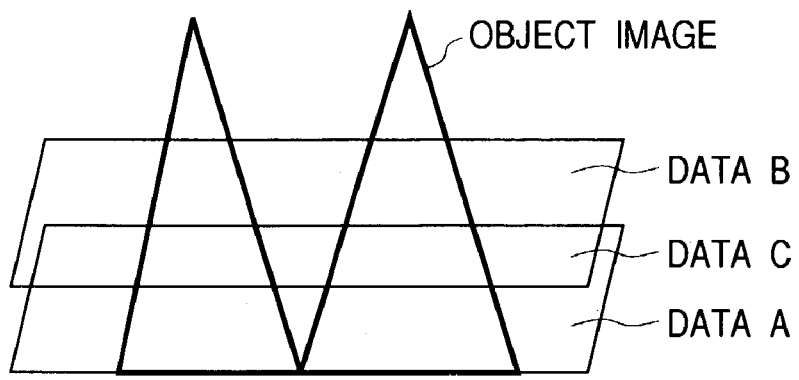
FIG. 11 is a schematic view showing image data when a character of an "M" shape to be recognized relatively easily is an object image.

FIG. 11 is a schematic view showing image data when a character of an "M" shape to be recognized relatively easily is an object image. Data A is image data of the object image at time t1, data B is image data of the object image at time of t2 (>t1), and data C is image data of an overlap portion. The image data of the data A is compared with the image data of the data B to recognize the data C of the image overlap portion and correct the data so as to be image data of the object image of the "M" shape.

As shown in the schematic view of FIG. 11, in the case of an object image which shape is recognized relatively easily, the image matching method of evaluating a degree of image similarity is preferred as a method of comparing the features of the data A and B with each other. If an image is complex as in the case of a fingerprint and portions of a fingerprint are compared with each other, the processing by the frequency analysis method is relatively easy. For the Marshal relation method, a somewhat large sensor area is preferred in order to detect end points or branch points of the downward line.

Figure 12:
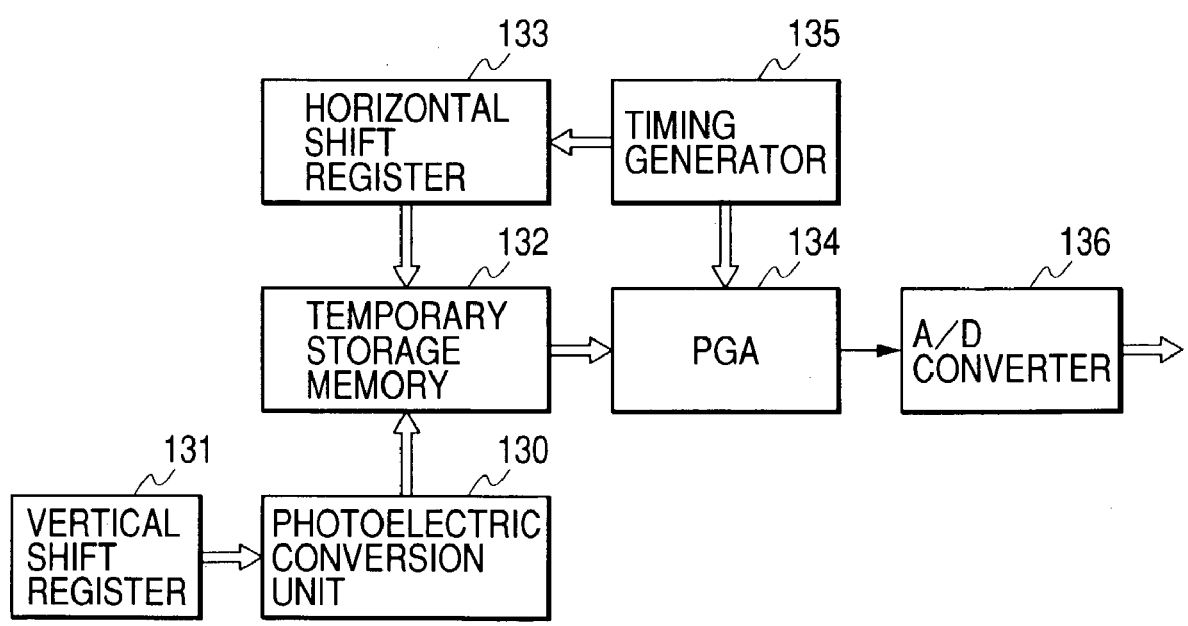
FIG. 12 is a view showing a circuit block of the sensor.
Figure 13:
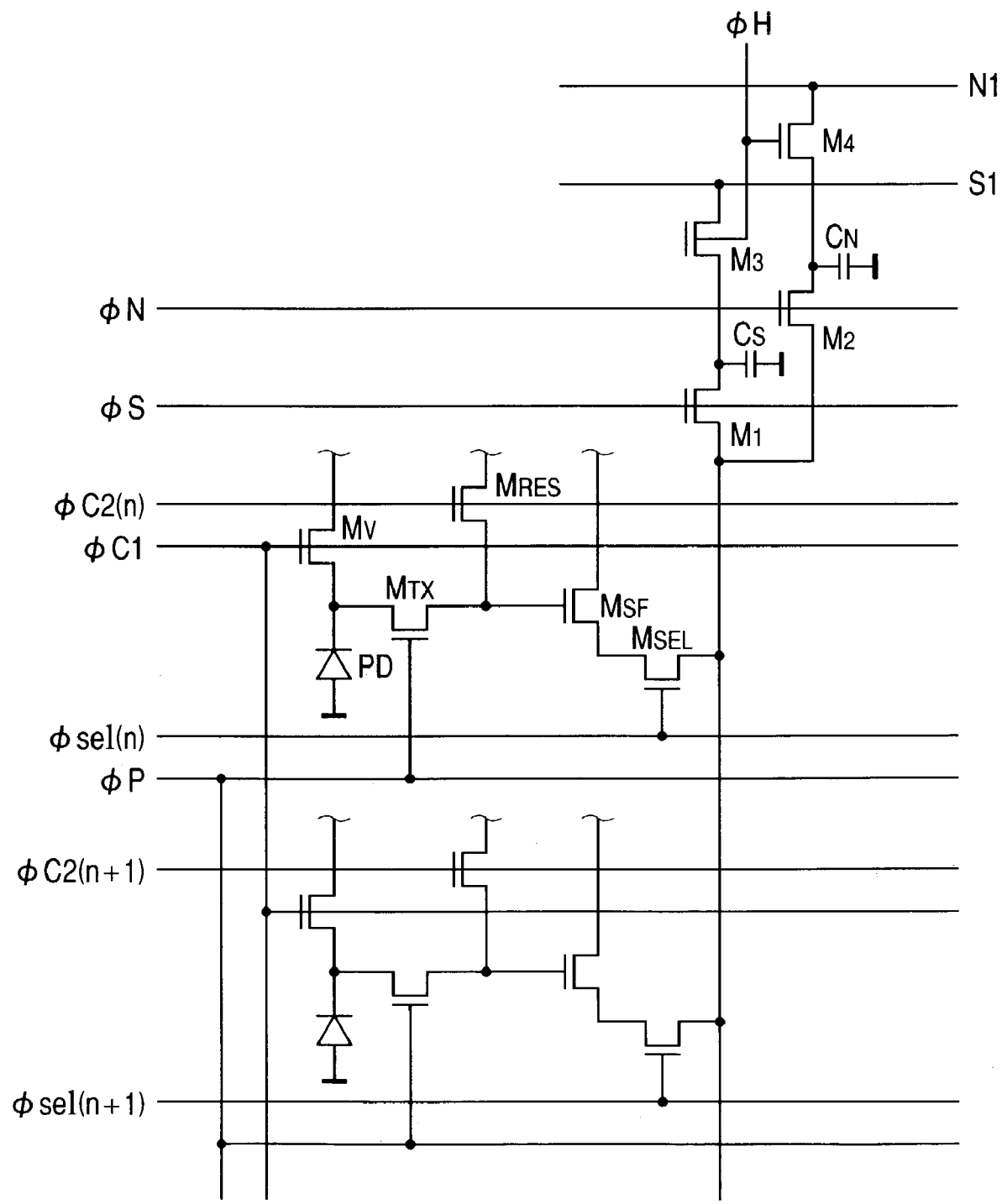
FIG. 13 is a view showing a sensor pixel portion.

FIGS. 12 and 13 show a constitutional example of the sensor 110. FIG. 12 shows a circuit block of the sensor, and FIG. 13 shows a sensor pixel portion.

In FIG. 12, a reference numeral 130 denotes a photoelectric conversion unit for reading images, 131 a vertical shift register (VSR) for selecting a scanning line of the photoelectric conversion unit 130, 132 a temporary storage memory temporarily storing a signal from the photoelectric conversion unit 130, and 133 a horizontal shift register (HSR) for transferring and controlling a signal from the temporary storage memory 132 to a differential amplifier and a gain variable amplifier (PGA) 134 of a rear stage. A signal from the PGA 134 is converted into a digital signal by an analog/digital converter (A/D converter) 136 and guided to the feature extraction unit 111 of the rear stage shown in FIG. 7. The vertical shift register 131, the temporary storage memory 132, the horizontal shift register 133, the PGA 134 and the A/D converter 136 are controlled by control signals from a timing generator 135. This timing generator 135 receives a signal outputted from a switch unit 121, and outputs a signal for controlling a start of the fingerprint image reading by the finger moving operation using all the pixel lines shown in FIG. 8A to the vertical shift register 131.

Next, constitutions of the photoelectric conversion unit 130 and the temporary storage memory 132 shown in FIG. 12 will be described by referring to FIG. 13. The photoelectric conversion unit used herein is constituted of a pixel amplifier system called a CMOS sensor. Each pixel has six elements. That is, one pixel is constituted of a photodiode PD, a reset switch $M_V$ for removing residual charge of the photodiode PD, a transfer switch $M_{TX}$ for transferring signal charge of the photodiode PD to the amplifier of the rear stage, a reset switch $M_{RES}$ for removing residual charge of a gate portion of the amplifier (buffer transistor), a buffer transistor $M_{SF}$ which serves as an amplifier for buffering signal voltage of the gate portion, and a switch $M_{SEL}$ for outputting and controlling a signal of the buffer transistor $M_{SF}$ to a vertical signal line. $M_1$ and $M_2$ denote switches for transferring signals from the vertical signal line to temporary storage capacities $C_S$, $C_N$. $M_3$ and $M_4$ denote switches for transferring a signal $S_1$ and noise $N_1$ from the capacities $C_S$, $C_N$ through a horizontal output line to the next differential amplifier (not shown). The reset switches $M_V$, $M_{RES}$ for blanket resetting and the transfer switch $M_{TX}$ for blanket transferring correspond to all pixel blanket exposure means. An all pixel blanket exposure period is from resetting of all pixels to the end of signal transferring by the transfer switch $M_{TX}$. In this period, a fingerprint image of a finger can be obtained by lighting the LED 1.

The signal of the photodiode PD is transferred to the capacity $C_S$, and the reset noise of the pixel amplifier (buffer transistor $M_{SF}$) is transferred to the capacity $C_N$.

An operation timing of the sensor will be described by referring to FIG. 14.

Figure 14:
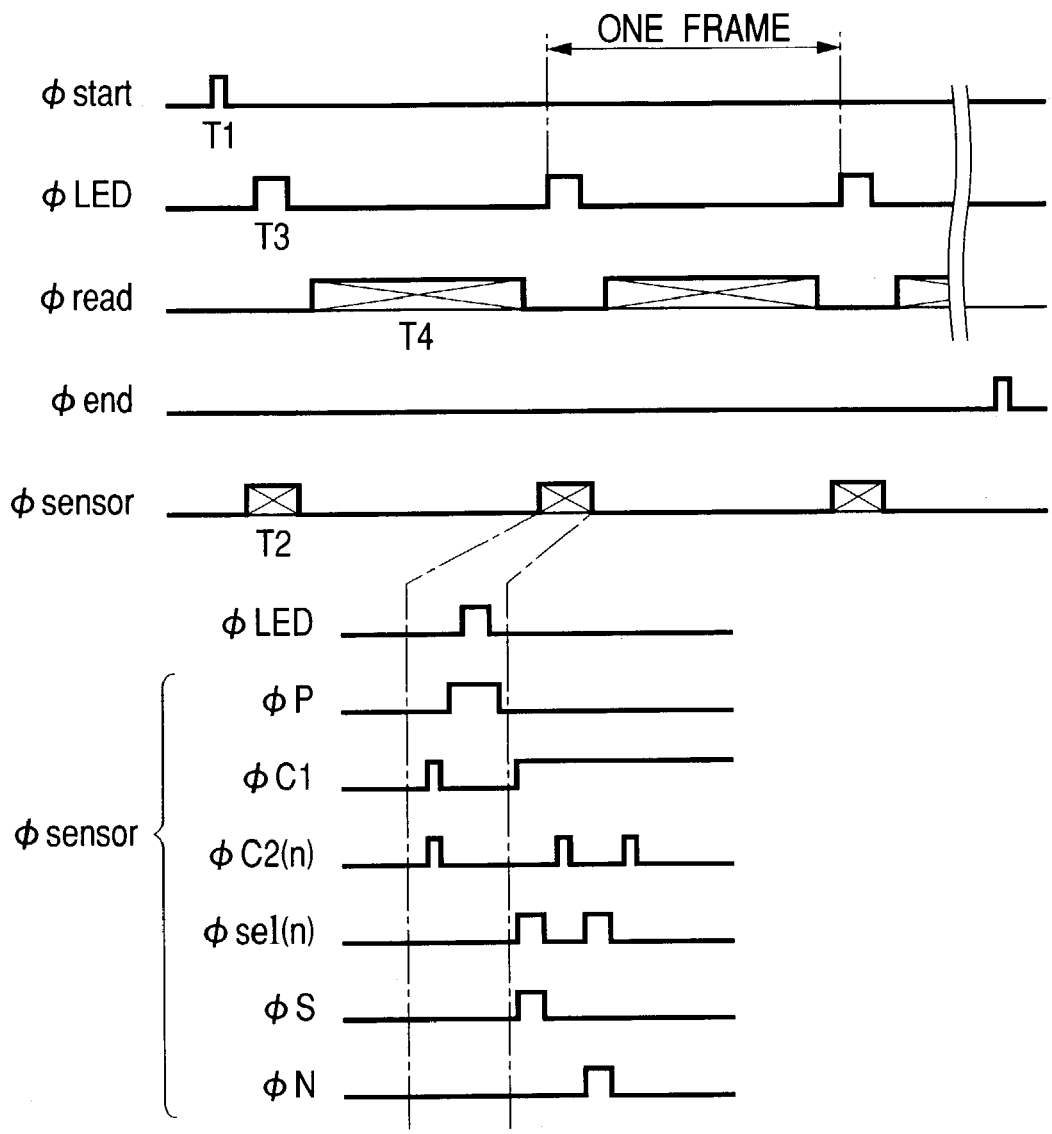
FIG. 14 is a timing chart showing an operation timing of the sensor.

A basic driving timing of FIG. 14 is that after all the pixels of the sensor are fully blanket-cleared, the LED 1 shown in FIG. 8B is lit to read portions of the fingerprint. Signals thereof are fully blanket-transferred to the amplifier gate portion (gate portion of the buffer transistor $M_{SF}$) of each pixel. The signal of the gate portion is transferred to the capacity $C_S$ on an each line basis to be stored. Then, the gate portion is reset, and its noise is stored in the capacity $C_N$. The signal and the noise are simultaneously transferred to the differential amplifier of the rear stage, where the noise is removed from the signal. This operation is repeated for each line.

The aforementioned operation will be described more in detail by referring to FIG. 14. First, when the finger on the sensor 110 is detected, an operation of the sensor is started in a period T1, and a control signal φstart is outputted from the timing generator 135. In a period T2, the vertical shift register 131 which has received the control signal φstart, first sets signals $\phi_{C1}$, $\phi_{C2(n)}$, $\phi_{C2(n+1)}$, . . . to H levels, and turns ON the switches $M_V$, $M_{RES}$ to clear the photodiode PD and the gate portion of the amplifier (gate portion of the buffer transistor $M_{SF}$) at all the pixels. Then, a signal $\phi_P$ is set to an H level simultaneously at all the pixels, and the transfer switch $M_{TX}$ is turned ON. At this time, the LED 1 is lit ($\phi_{LED}$ is at an H level) to irradiate the moving finger with light. Reflected light from the finger is subjected to photoelectric conversion at the photodiode PD of each pixel, and a signal from the photodiode PD is transferred to the gate portion of the amplifier (gate portion of the buffer transistor $M_{SF}$). Accordingly, the finger image is read by an amount equivalent to twenty lines. Incidentally, in the OFF state of the transfer switch $M_{TX}$, the LED 1 may be lit for a period T3, and then the transfer switch $M_{TX}$ may be turned ON to transfer the signal. In the lit period of the LED 1 (light irradiation period), control is carried out so as to coincide with an exposure period of the all pixel blanket exposure means or to be within the exposure period, whereby consumption of power can be reduced. An output signal of the amplifier is stored in the capacity $C_S$ by setting signals $\phi_{sel(n)}$ and $\phi_S$ to H levels, and turning ON the switches $M_{SEL}$ and $M_1$.

Then, a signal $\phi_{C2(n)}$ is set to an H level, and the switch $M_{RES}$ is turned ON to reset the gate portion of the amplifier (gate portion of the buffer transistor $M_{SF}$). Then, the signals $\phi_{sel(n)}$ and $\phi_N$ are set to H levels, and the switches $M_{SEL}$ and $M_2$ are turned ON to transfer reset noise to the capacity $C_N$. At this time, in order to prevent leakage of charge to the gate portion by charge excess due to external light, the photodiode PD is controlled to a fixed potential by setting the signal $\phi_{C1}$ to an H level and turning ON the switch $M_V$. The signal and the noise stored in the capacities $C_S$, $C_N$ are sequentially transferred to the rear stage to be processed. After the sequential reading of the signals and the noise of the pixel of the n-th line for each row, an output signal of the amplifier of the pixel of a next n+1-th line is transferred to the capacity $C_S$, reset noise is transferred to the capacity $C_N$, and a reading operation is carried out to process transfer to the rear stage. In this way, reading of each pixel line is carried out. A period T4 is for reading all the pixel signals to the rear stage. When absence of the finger on the sensor 110 is detected, a signal φend is outputted from the timing generator 35, and the operation of the sensor is stopped.

Figure 15:
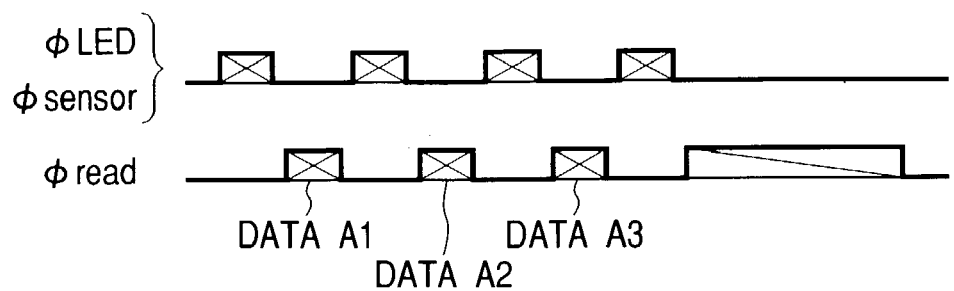
FIG. 15 is a timing chart showing an operation timing of the sensor.

FIG. 15 is a timing chart showing a timing example for determining whether or not there is the finger. The portion of the plurality of pixel lines of the sensor 110 shown in FIG. 9 is repeatedly driven to read data A1, data A2, data A3, . . . (each data is output data from the portion of the plurality of pixel lines). Then, when a change of a state where no finger feature point is extracted (finger is not arranged) to a state where the finger feature point is extracted (finger is arranged) is detected based on these data, the fingerprint image is read by a finger moving operation using all the pixel lines.

In the described case, a method of setting time of reading all the pixels is important. That is, it is necessary to determine a frame speed of the sensor by predicting a highest moving speed of the finger or setting it by assumption. If a frame speed is low, the fingerprint may be blurred by the movement of the finger. Alternatively, if a frame speed is too high, more image memories must be prepared in the case of a slower finger movement.

According to the embodiment, a pixel size is set to 30 µm angle, and a highest moving speed of the finger is set to 1 cm/0.1 sec. Then, if LED lighting time is 28 µsec, the movement of the finger in this period is 2.8 µm, and image blurring or a sampling error between the frames is ⅒ or lower of a maximum pixel size. Assuming that image overlapping is equivalent to minimum five pixels, the process is repeated for about 1.4 msec at 150 µm, and thus a frame rate is about 714 frames/sec. As a φread period is about 1.4 msec., a signal output frequency is about 8 MHz. If the LED lighting period is further shortened, an image sampling error can be reduced, and fingerprint reproducibility after image synthesis is high, whereby authentication accuracy can be increased.

If the sensor is driven based on the foregoing as an assumption to enable later-described image synthesis, it is possible to carry out satisfactory authentication even if the feature point extraction method is any one of the frequency analysis method, the image matching method and the relation method. It is only necessary to set a feature point extraction method or a frame speed in accordance with a purpose (necessary authentication accuracy).

As a method for detecting the fingerprint, in addition to the optical system for irradiating the finger with light and detecting the fingerprint by the optical sensor based on its reflected light or transmitted light (or scattered/transmitted light), there is a semiconductor sensor system for detecting the fingerprint by placing the finger on a semiconductor sensor such as a piezoelectric element, a capacitance detection element, a temperature detection element or the like, and detecting a pressure, a capacity, a temperature or the like. According to the present invention, any detection method can be used. However, since an image is picked up so that portions of a dynamic image are overlapped in the invention, the sensor 110 must have a faster reading speed compared with the finger moving speed.

Next, another embodiment of an image input apparatus of the present invention will be described. According to the embodiment, a movement of a finger is determined to control a start of driving of FIG. 14.

Figure 16:
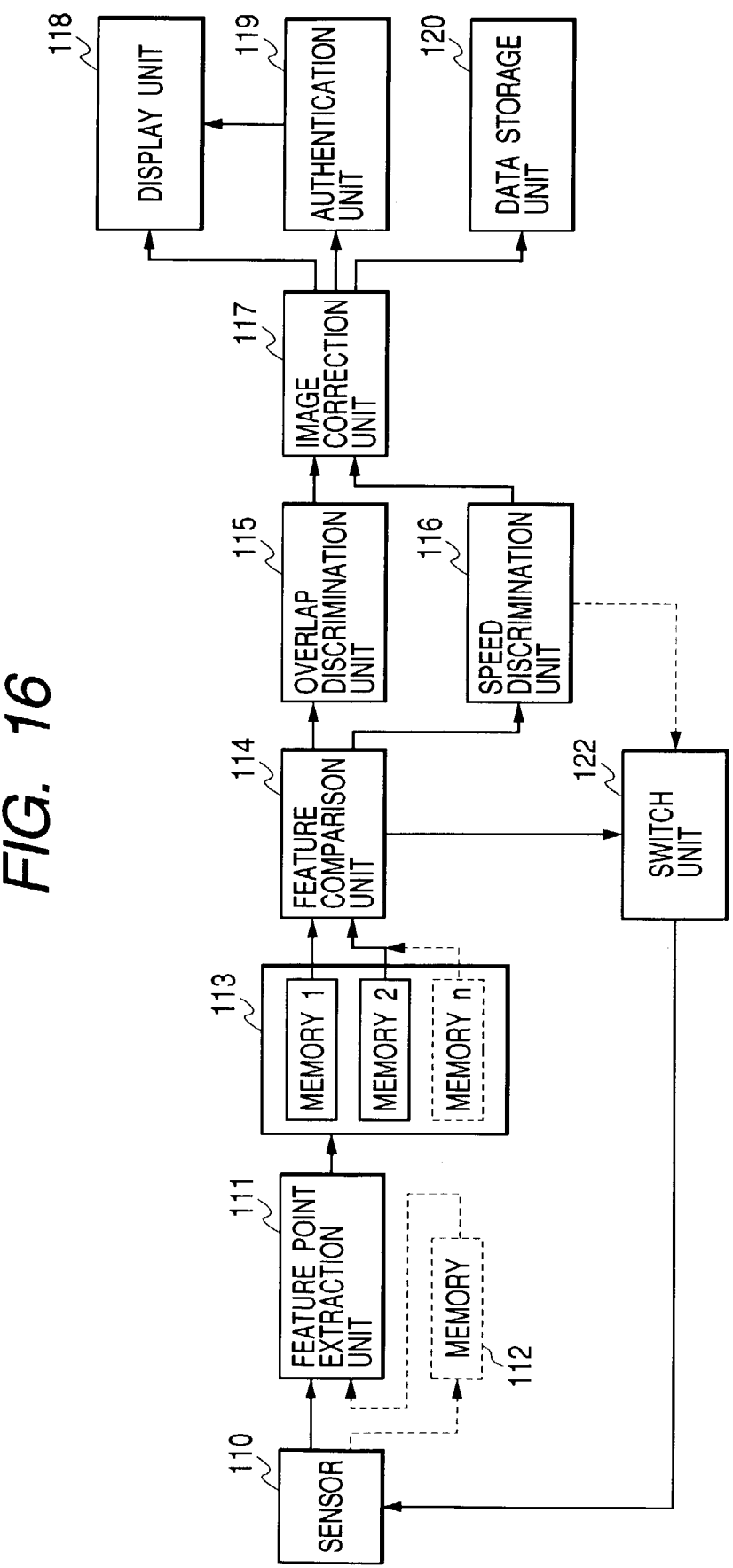
FIG. 16 is a system view of an image input apparatus according to yet another embodiment of the present invention.

FIG. 16 is another system view of the image input apparatus of the embodiment. Data can be read at a timing shown in FIG. 15 to determine the movement of the finger. In FIG. 16, components similar to those of FIG. 7 are denoted by similar reference numerals.

As shown in FIG. 9, a signal is read by using a portion of a plurality of pixel lines of the sensor 110, and whether or not there is the movement of the finger on the sensor 110 is determined. As shown in FIG. 15, the portion of the plurality of pixel lines of the sensor 110 of FIG. 9 is repeatedly driven to obtain data A1, data A2, data A3, . . . (each data is output data from the portion of the plurality of pixel lines). These data are inputted through the memory 112 or directly to the feature point extraction unit 111, and feature points of a partial finger image are extracted. The feature points are stored in the memory 113 on desired pixel line basis for each frame. For example, the data A1 is stored in a memory area 1, the data A2 in a memory area 2 . . . , and data Am in a memory area m (m is a numeral smaller than n: m<n). The feature points of the respective data are compared with one another at the feature point comparison unit 114. The data comparison is made, for example the data A1 with the data A2, the data A2 with the data A3 etc. If a data comparison value exceeds a certain set value indicating noncoincidence, the feature point comparison unit 114 detects the movement of the finger, and a moving speed of the finger in a coincident position of the feature points is calculated by the speed discrimination unit 116. A switch signal is sent from the feature point comparison unit 114 or from the feature point comparison unit 114 and the speed discrimination unit 116 to the switch unit 122. The switch unit 122 outputs a signal for controlling a start of the driving of FIG. 14 to the timing generator 136. Since a signal indicating a level of a finger moving speed is sent from the speed discrimination unit 116 to the switch unit 122 or the timing generator 136 of the sensor 110, and the sensor can be driven in accordance with the moving speed, the necessary number of memories is small. Power consumption by the LED 101 can also be reduced. Moreover, since not all the pixel lines are scanned in determination of the finger movement, low power consumption of the system can be achieved.

Now, data overlapping between the driving frames of FIG. 14 will be described with reference to FIG. 11. For simpler explanation, it is assumed that a character M is moved as an object on the sensor in place of the fingerprint. The overlap data C between the data A of a frame A and the data B of a frame B is an overlap of a fetched image, i.e., an overlap portion. Overlap data is increased as the movement of the object slows down, creating a problem of extended frame driving time. However, by driving the sensor in accordance with a moving speed of the object to reduce the overlap data, a memory capacity can be reduced.

As described above, according to the embodiment, since the compact sensor is used, the apparatus can be reduced in cost and size. Moreover, power consumption can be reduced and high accuracy authentication can be carried out, whereby the apparatus can be applied to portable devices.

A third embodiment will be described.

Figure 18A:
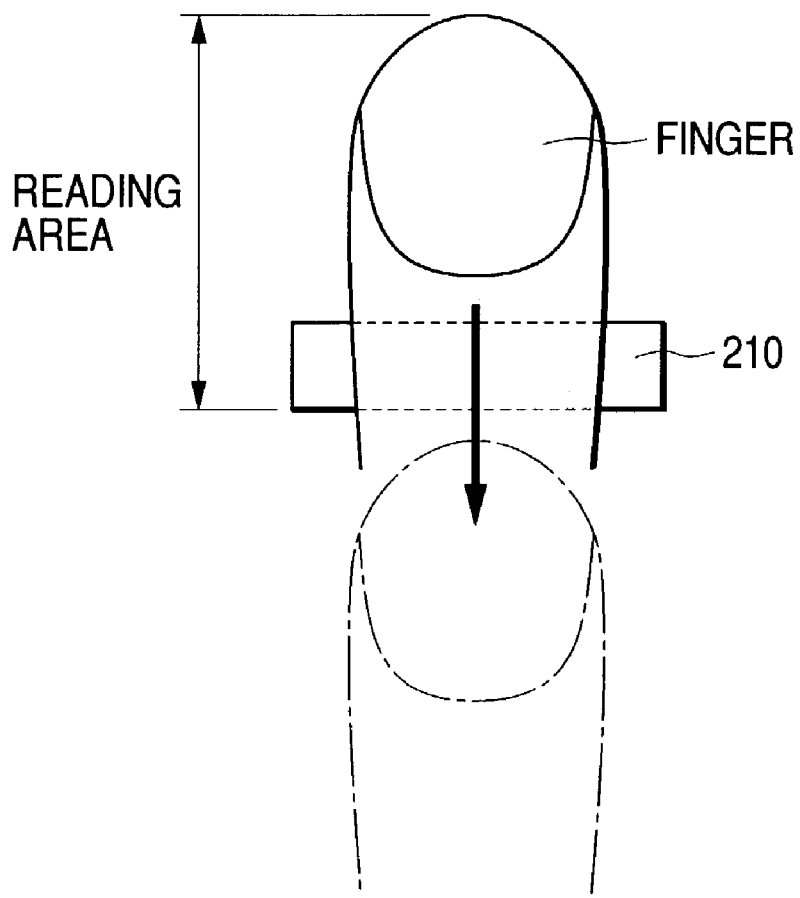
FIG. 18A is a view schematically showing movements of a sensor and a finger.
Figure 18B:
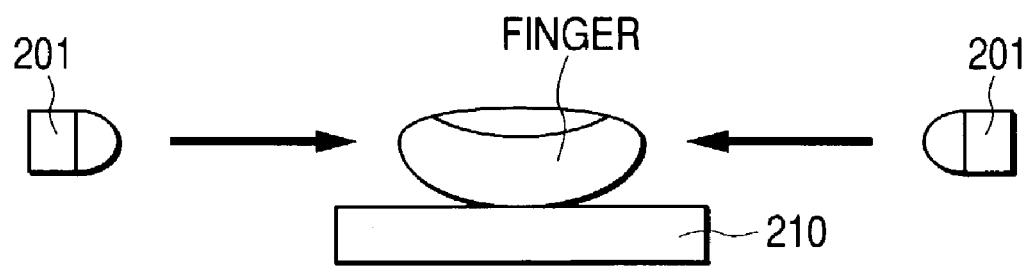
FIG. 18B is a view schematically showing a constitution of an optical fingerprint reader.

FIG. 18A schematically shows movements of a sensor and a finger. FIG. 18B schematically shows a constitution of an optical fingerprint reader. According to the embodiment, a sensor 210 of 540 horizontal pixels and 20 vertical pixels is used. For example, in the case of carrying out fingerprint authentication, since about 500 vertical pixels are normally used, a size of the sensor used in the embodiment is very small in comparison. Incidentally, in the embodiment, since an entire image is not read by the sensor but a portion of the image is read, the number of vertical pixels may be set only to be sufficient for reading a portion of the image. The finger is arranged on the sensor 210 (protective member such as a thin plate glass or a fiber plate is arranged on the sensor 210 when necessary) and, in the present embodiment, as shown in FIG. 18A, the finger is moved in a direction vertical to a longitudinal direction of the sensor 210 (indicated by an arrow in FIG. 18A) to sequentially read images.

As shown in FIG. 18B, light is radiated from a LED 1 which serves as light irradiation means on a side portion of the finger (it may be from an upper direction, an upper oblique direction, a lower direction or a lower oblique direction but preferably from the side portion in order to miniaturize an apparatus). Then the light is scattered/transmitted through the finger, and made incident from the finger on the sensor 210 to obtain a fingerprint image.

Figure 20:
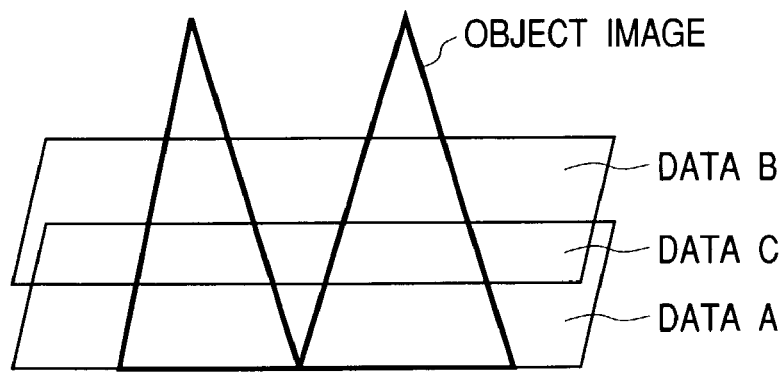
FIG. 20 is a schematic view showing image data when a character of an "M" shape to be recognized relatively easily is an object image.

FIG. 20 is a schematic view showing image data when the finger is replaced by a character of an "M" shape to be recognized relatively easily as an object image. Data A is image data of the object image at time t1, data B image data of the object image at time t2 (>t1), and data C overlap image data, i.e., an overlap portion. In this case, when a movement of the object image is slow, overlap data is increased to extent frame driving time. Thus, according to the present embodiment, the overlap data can be reduced by driving the sensor in accordance with a moving speed of the object, and a memory capacity can be reduced by reducing the number of times of reading all the pixels.

Figure 19A:
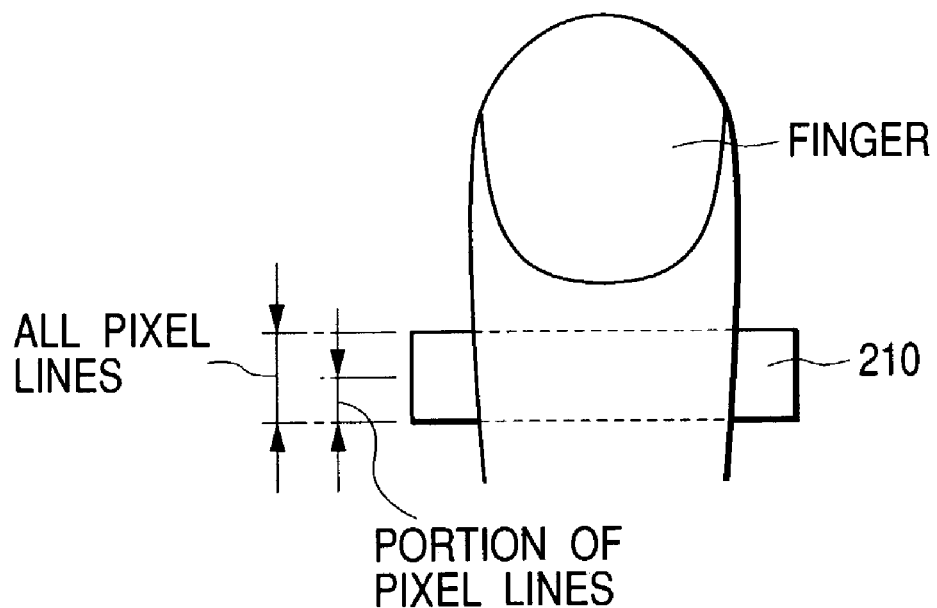
FIGS. 19A and 19B are views explaining a reading operation of the sensor.
Figure 19B:
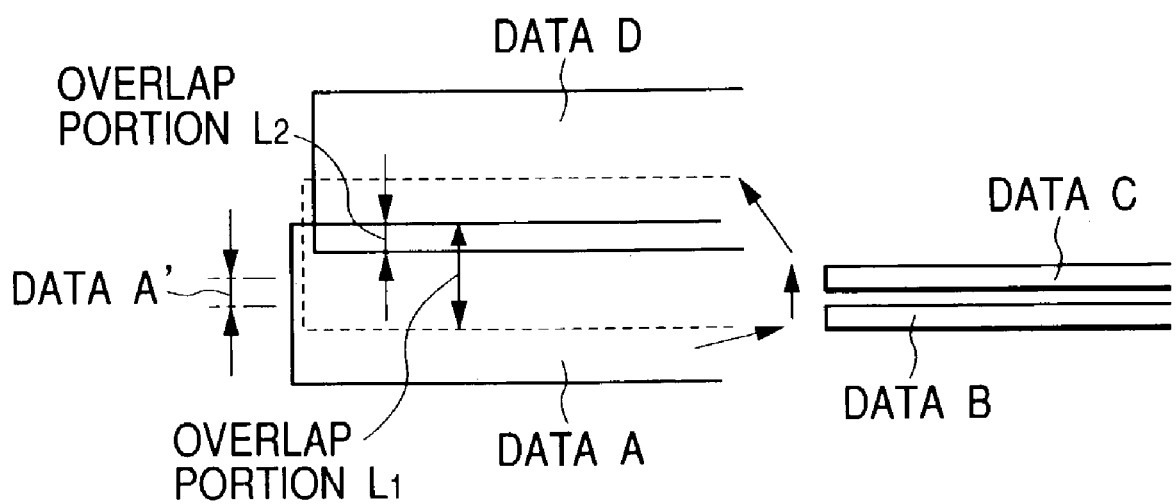

FIGS. 19A and 19B are conceptual views of an operation of the embodiment. As shown in FIG. 19A, in addition to the fingerprint image reading mode using all the pixel lines (twenty lines) of the sensor 212 described above with reference to FIGS. 18A and 18B (all pixel reading mode), a fingerprint reading mode using a portion of a plurality of pixel lines of the sensor 210 (partial pixel reading mode) is set. As shown in FIG. 19B, first, the data A is read by the sensor 210 on the all pixel reading mode, and then the partial pixel reading mode is repeated. When there is data coincident with data A' of the data A among the data B, the data C, . . . , next reading is carried out on the all pixel reading mode to obtain data D. In the operation of the embodiment, an overlap portion L2 between the data A and the data D on the all pixel reading mode can be reduced compared with an overlap portion L1 when the all pixel reading mode is repeated (data when partial pixel reading mode is not executed after reading of the data A but the all pixel reading mode is executed is indicated by a broken line). Thus, even if the finger moving speed is slow, the overlap portion can be reduced.

Figure 17:
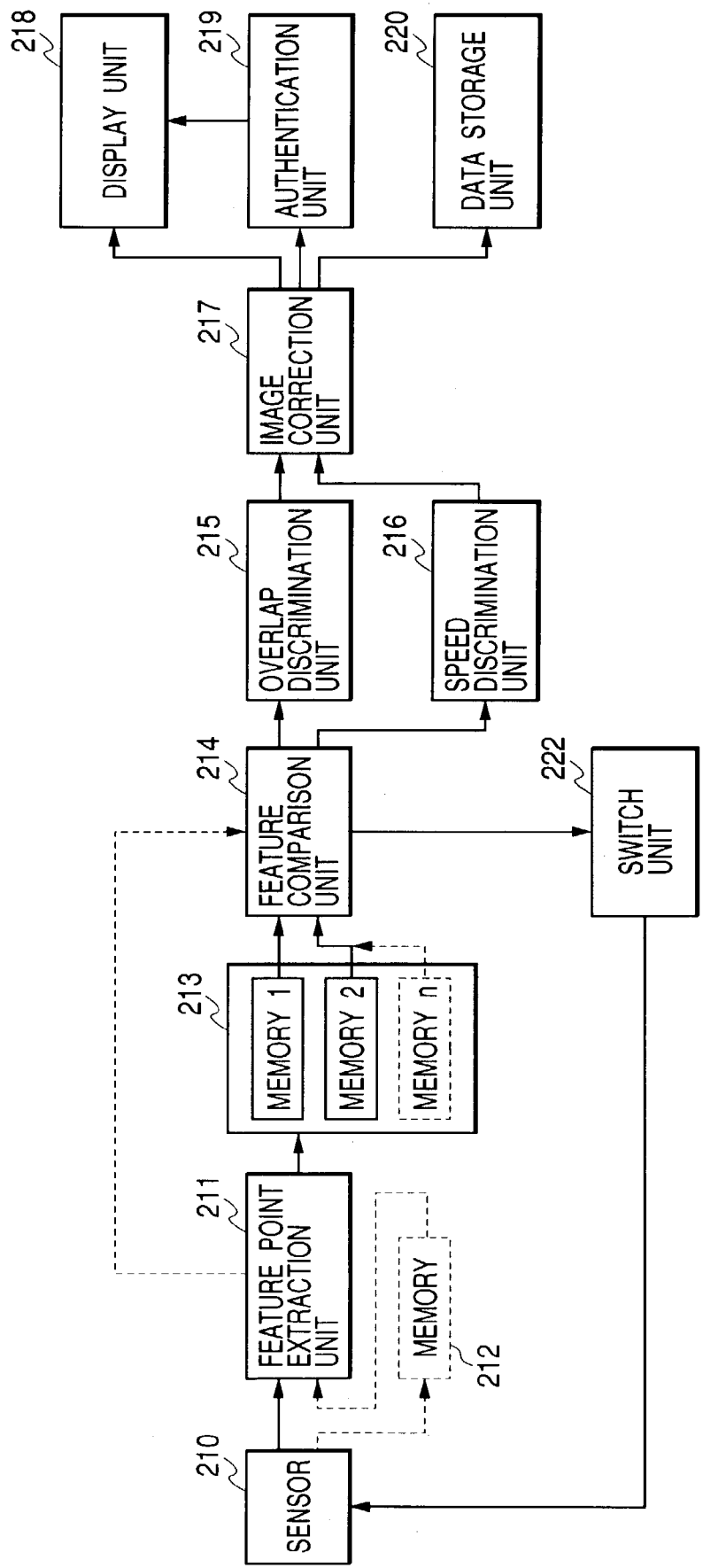
FIG. 17 is a system view of an image input apparatus according to yet another embodiment of the present invention.

FIG. 17 is a system view of the image input apparatus according to the embodiment of the present invention. To explain by referring to FIG. 19A, when the presence of the finger on the sensor 210 is confirmed and the finger is moved, the sensor 210 outputs a portion of the picked-up image of the finger (data A of FIG. 19B) by using all the pixel lines. An image signal from the sensor 210 is temporarily stored in a memory 212 or directly inputted to a feature point extraction unit 211, and then feature points of the portion of the finger image are extracted. The feature point extraction will be separately described later. The feature points are stored as feature points of a 1st frame in a memory area 1 of a memory 213 on a desired pixel line basis.

Then, as shown in FIGS. 19A and 19B, a portion of a plurality of pixel lines of the sensor 210 is driven to obtain a picked-up image (data B of FIG. 19B). This data B is inputted through the memory 212 or directly to the feature point extraction unit 211, and feature points of the image are extracted. The feature points are stored in a memory area 2 of the memory 213 on a pixel line basis. The feature points of the data A' of the data A stored in the memory area 1 are compared with the feature points of the data B stored in the memory area 2 at a feature point comparison unit 214. If the feature points of the data A' and the data B coincide with each other or coincide with exceeding a certain set value, the feature comparison unit 214 sends a control signal to a switch unit 222, and the switch unit 222 switches the sensor 210 to an all pixel reading mode. Additionally, a moving speed of the finger in a position of a pixel line of the coincident feature points is calculated by a speed discrimination unit 216. The feature points of the data B may not be present in the memory 213 but directly inputted from the feature point extraction unit 211 to the feature point comparison unit 214, and compared with the feature points of the data A'.

If the feature points of the data A' and the data B dot not coincide with each other, a portion of the plurality of pixel lines of the sensor 210 is driven to obtain a picked-up image (data C of FIG. 19B). As in the case of the aforementioned operation, the feature points of the data A' are compared with the feature points of the data C, and partial pixel reading is carried out until the feature points of data obtained by the partial pixel reading coincide with the feature points of the data A' or coincide with each other with exceeding a certain set value.

When the processing is switched to the all pixel reading mode by the switch unit 222 to carry out all pixel reading, as in the case of the aforementioned operation, an image signal from the sensor 210 is temporarily stored as data D in the memory 212 or directly inputted to the feature point extraction unit 211, and feature points of a portion of the finger image are extracted. The feature points are stored as feature points of a 2nd frame in the memory area 2 of the memory 213 on a desired pixel line basis. In all pixel reading, the data B or the data D stored in the memory area 2 by the partial pixel reading is deleted.

As described above, the partial pixel reading is carried out after the all pixel reading and, when a portion of the data by the all pixel reading coincides with the data by the partial pixel reading or almost coincides, a next reading operation at all the pixels sequentially is carried out. Accordingly, a frame speed can be set by detecting the finger moving speed with respect to the sensor. In this case, even if the finger moving speed is changed, the frame speed is correspondingly changed to enable adjustment of an overlap portion (frame speed can be changed corresponding to a change of the moving speed). Incidentally, if the finger moving speed is not changed so much, a speed from the data A to the data D (frame speed) is first set. After this setting, partial pixel reading is not carried out, and an operation from next all pixel reading and after can be performed at this frame speed.

Thus, the feature points of the data having a small number of overlap portions are sequentially stored in the memory 213. For example, a 1st frame by all pixel reading is written in the memory area 1, a 2nd frame in the memory area 2, . . . , an n-th frame in a memory area n. The feature points of the respective frames are compared with one another at the feature point comparison unit 214, and a moving speed of the finger in a position of a pixel line in which the feature points coincide with each other is calculated by the speed discrimination unit 116. Simultaneously, image overlapping between the frames, i.e., an image overlap area, is determined by an overlap determination unit 215, modification (correction) is made to prevent image overlapping at an image correction unit (image synthesis unit) 217, and the image is displayed by a display unit 218. The image is stored in a data storage unit 220 in registration. In case of authentication, the image is compared with data stored in an authentication unit 219, and displayed by the display unit 290 together with the corrected image of the finger an authentication result indicated by fingerprint coincidence/noncoincidence. In the case of noncoincidence, the finger is moved again. In the case of coincidence, the process proceeds to a purpose of the device (e.g., use of a cell phone is permitted to enable calling).

There are three general methods of feature point extraction. They are a method for extracting fingerprint features (end points or branch points) such as a downward line structure from a fingerprint image (e.g., Marshal relation method), an image (pattern) matching method of evaluating a degree of image similarity, and a frequency analysis method of subdividing a fingerprint image in a horizontal direction (direction vertical to a finger longitudinal direction) and frequency-analyzing downward line gradation difference among the images.

As shown in a schematic view of FIG. 20, in the case of an object image which shape is recognized relatively easily, the image matching method of evaluating a degree of image similarity is preferred as a method of comparing the features of the data A and B with each other. If an image is complex as in the case of a fingerprint and portions of a fingerprint are compared with each other, the processing by the frequency analysis method is relatively easy. For the Marshal relation method, a somewhat large sensor area is preferred in order to detect end points or branch points of the downward line.

Figure 21:
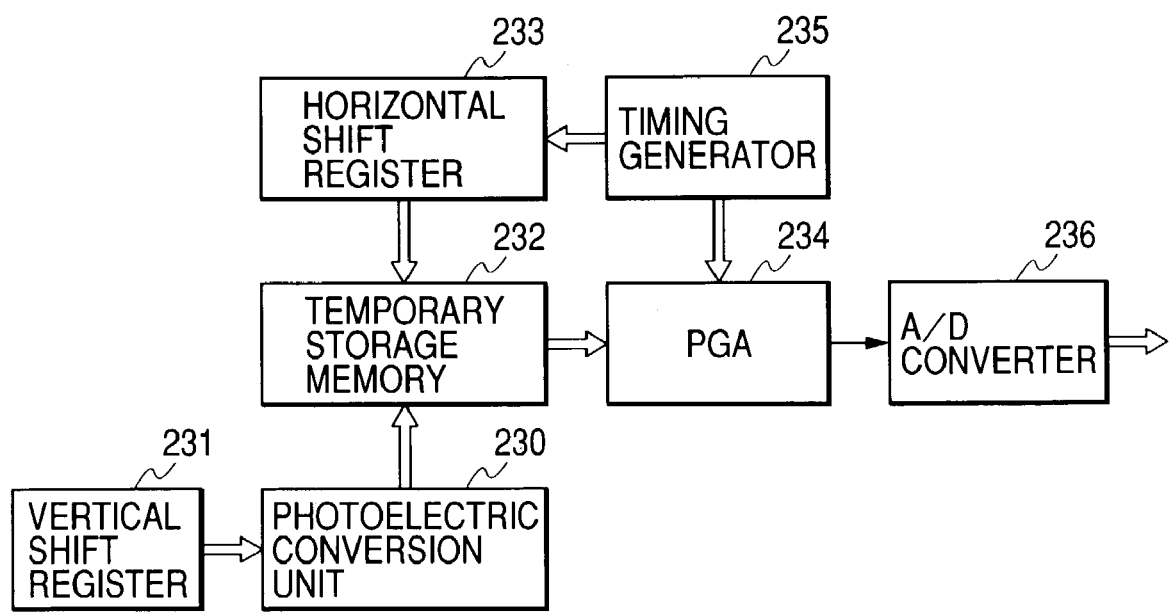
FIG. 21 is a view showing a circuit block of the sensor.
Figure 22:
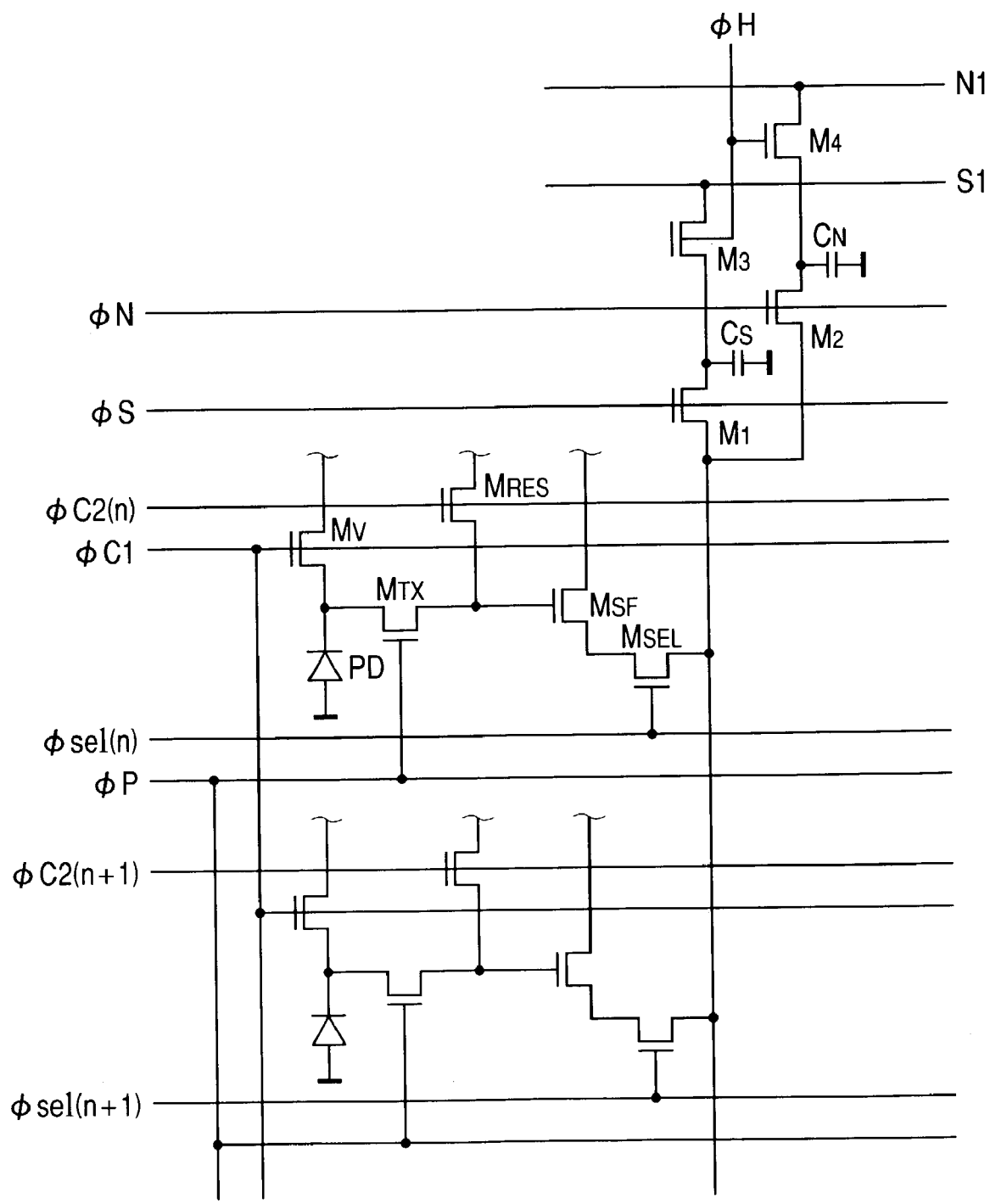
FIG. 22 is a view showing a sensor pixel portion.

FIGS. 21 and 22 show a constitutional example of the sensor 210. FIG. 21 shows a circuit block of the sensor, and FIG. 22 shows a sensor pixel portion.

In FIG. 21, a reference numeral 230 denotes a photoelectric conversion unit for reading images, 231 a vertical shift register (VSR) for selecting a scanning line of the photoelectric conversion unit 230, 232 a temporary storage memory for temporarily storing a signal from the photoelectric conversion unit 230, and 233 a horizontal shift register (HSR) for transferring and controlling a signal from the temporary storage memory 232 to a differential amplifier and a gain variable amplifier (PGA) 234 of a rear stage. A signal from the PGA 234 is converted into a digital signal by an analog/digital converter (A/D converter) 236 and guided to the feature extraction unit 211 of the rear stage shown in FIG. 17. The vertical shift register 231, the temporary storage memory 232, the horizontal shift register 233, the PGA 234 and the A/D converter 236 are controlled by control signals from a timing generator 235. This timing generator 235 receives a signal outputted from a switch unit 221 shown in FIG. 17, and outputs to the vertical shift register 231 a signal for controlling a start of the fingerprint image reading by the finger moving operation using all the pixel lines shown in FIG. 18A.

Next, constitutions of the photoelectric conversion unit 230 and the temporary storage memory 232 shown in FIG. 21 will be described by referring to FIG. 23. The photoelectric conversion unit used herein is constituted of a pixel amplifier system called a CMOS sensor. Each pixel has six elements. That is, one pixel is constituted of a photodiode PD, a reset switch $M_V$ for removing residual charge of the photodiode PD, a transfer switch $M_{TX}$ for transferring signal charge of the photodiode PD to the amplifier of the rear stage, a reset switch $M_{RES}$ for removing residual charge of a gate portion of the amplifier (buffer transistor), a buffer transistor $M_{SF}$ which becomes an amplifier for buffering signal voltage of the gate portion, and a switch $M_{SEL}$ for outputting and controlling a signal of the buffer transistor $M_{SF}$ to a vertical signal line. $M_1$ and $M_2$ denote switches for transferring signals from the vertical signal line to temporary storage capacities $C_S$, $C_N$. $M_3$ and $M_4$ denote switches for transferring a signal $S_1$ and noise $N_1$ from the capacities $C_S$, $C_N$ through a horizontal output line to the next differential amplifier (not shown). The reset switches $M_V$, $M_{RES}$ for blanket resetting and the transfer switch $M_{TX}$ for blanket transferring correspond to all pixel blanket exposure means. An all pixel blanket exposure period is from resetting of all pixels to the end of signal transferring by the transfer switch $M_{TX}$. In this period, a fingerprint image of a finger can be obtained by lighting the LED 1.

The signal of the photodiode PD is transferred to the capacity $C_S$, and the reset noise of the pixel amplifier (buffer transistor $M_{SF}$) is transferred to the capacity $C_N$.

An operation timing of the sensor will be described by referring to FIG. 23.

Figure 23:
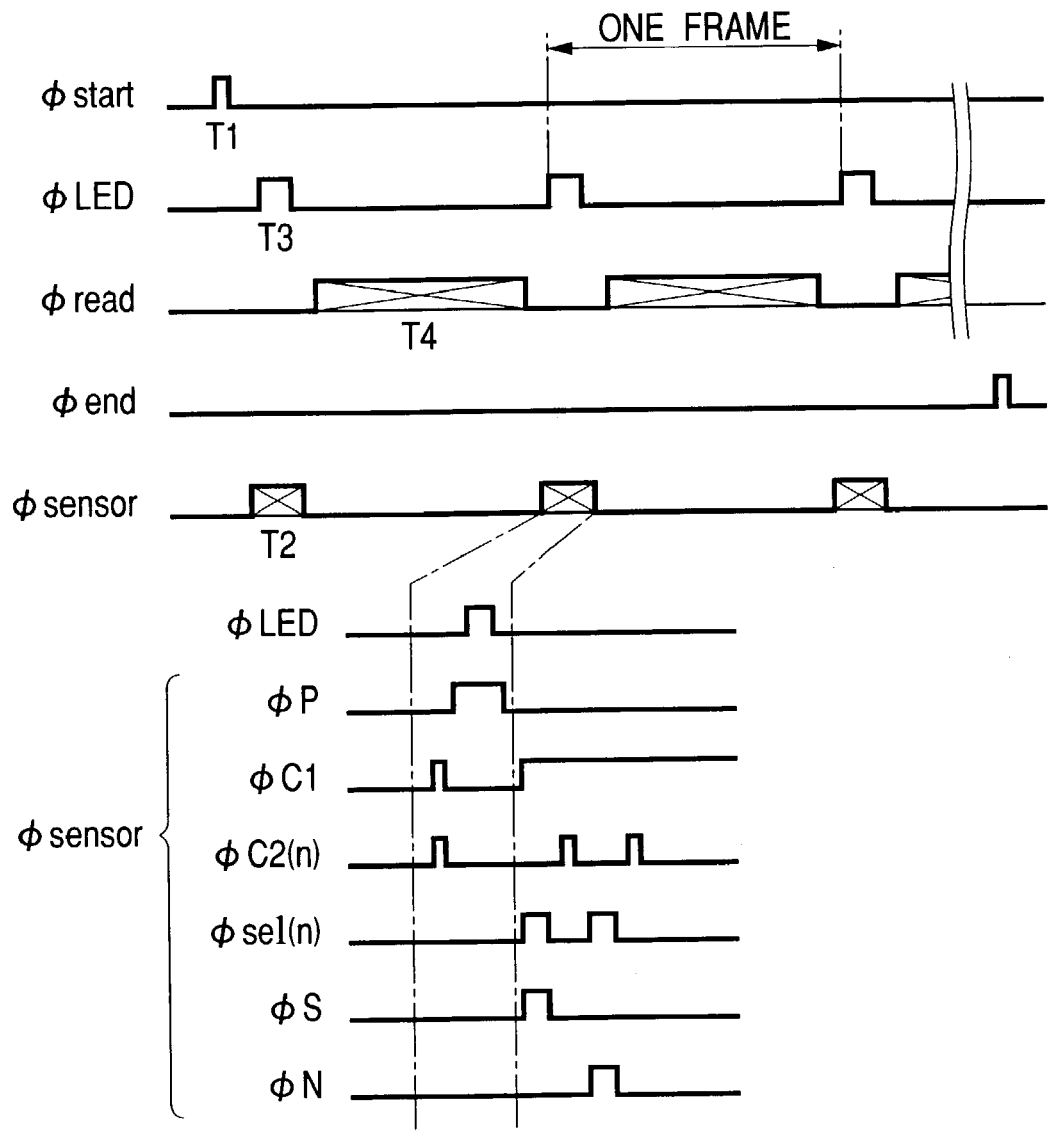
FIG. 23 is a timing chart showing an operation timing of the sensor.

A basic driving timing of FIG. 23 is that after all the pixels of the sensor are fully blanket-cleared, the LED 1 shown in FIG. 18B is lit to read portions of the fingerprint. Signals thereof are fully blanket-transferred to the amplifier gate portion (gate portion of the buffer transistor $M_{SF}$) Of each pixel. The signal of the gate portion is transferred to the capacity $C_S$ for each line to be stored. Then, the gate portion is reset, and its noise is stored in the capacity $C_N$. The signal and the noise are simultaneously transferred to the differential amplifier of the rear stage, where the noise is removed from the signal. This operation is repeated for every line.

The aforementioned operation will be described more in detail by referring to FIG. 23. First, when the finger on the sensor 210 is detected, an operation of the sensor is started in a period T1, and a control signal ϕstart is outputted from the timing generator 235. In a period T2, the vertical shift register 231 which has received the control signal ϕstart, first sets signals $\phi_{C1}$, $\phi_{C2(n)}$, $\phi_{C2(n+1)}$, . . . to H levels, and turns ON the switches $M_V$, $M_{RES}$ to clear the photodiode PD and the gate portion of the amplifier (gate portion of the buffer transistor $M_{SF}$) at all the pixels. Then, a signal $\phi_P$ is set to an H level simultaneously at all the pixels, and the transfer switch $M_{TX}$ is turned ON. At this time, the LED 1 is lit ($\phi_{LED}$ is at an H level) to irradiate the moving finger with light. Reflected light from the finger is subjected to photoelectric conversion at the photodiode PD of each pixel, and a signal from the photodiode PD is transferred to the gate portion of the amplifier (gate portion of the buffer transistor $M_{SF}$). Accordingly, the finger image is read by an amount equivalent to twenty lines. Incidentally, in the OFF state of the transfer switch $M_{TX}$, the LED 1 may be lit for a period T3, and then the transfer switch $M_{TX}$ may be turned ON to transfer the signal. In the lit period of the LED 1 (light irradiation period), control is carried out so as to coincide with an exposure period of the all pixel blanket exposure means or to be within the exposure period, whereby consumption of power can be reduced. An output signal of the amplifier is stored in the capacity $C_S$ by setting signals $\phi_{sel(n)}$ and $\phi_S$ to H levels, and turning ON the switches $M_{SEL}$ and $M_1$.

Then, a signal $\phi_{C2(n)}$ is set to an H level, and the switch $M_{RES}$ is turned ON to reset the gate portion of the amplifier (gate portion of the buffer transistor $M_{SF}$). Then, the signals $\phi_{sel(n)}$ and $\phi_N$ are set to H levels, and the switches $M_{SEL}$ and $M_2$ are turned ON to transfer reset noise to the capacity $C_N$. At this time, in order to prevent leakage of charge to the gate portion by charge excess due to external light, the photodiode PD is controlled to a fixed potential by setting the signal $\phi_{C1}$ to an H level and turning ON the switch $M_V$. The signal and the noise stored in the capacities $C_S$, $C_N$ are sequentially transferred to the rear stage to be processed. After the sequential reading of the signals and the noise of the pixel of the n-th line for each row, an output signal of the amplifier of the pixel of a next n+1-th line is transferred to the capacity $C_S$, reset noise is transferred to the capacity $C_N$, and a reading operation is carried out to process transfer to the rear stage. In this way, reading of each pixel line is carried out. A period T4 is for reading all the pixel signals to the rear stage. When no finger on the sensor 210 is detected, a signal ϕend is outputted from the timing generator 235, and the operation of the sensor is stopped.

Figure 24:
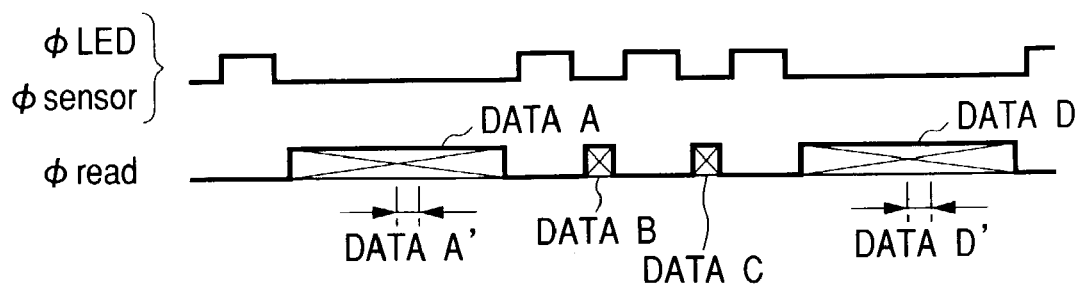
FIG. 24 is a timing chart showing an operation timing of the sensor.

FIG. 24 is a timing chart of the operation shown in FIG. 19B. The data A is read by the sensor 210 on the all pixel reading mode, and then the partial pixel reading mode is repeated. If there is data coincident with the data A' of the data A among the obtained data B, the data C, . . . (here, the data C coincides with the data A'), next reading is carried out on the all pixel reading mode to obtain data D. By repeating such operations sequentially, fingerprint reading is carried out for the entire finger on the all pixel reading mode.

In the described case, a method for setting time of reading all the pixels is important. That is, it is necessary to determine a frame speed of the sensor by predicting a highest moving speed of the finger or setting it by assumption. If a frame speed is low, the fingerprint may be blurred by the movement of the finger. Alternatively, if a frame speed is too high, more image memories must be prepared in the case of a slower finger movement.

According to the embodiment, a pixel size is set to 30 μm angle, and a highest moving speed of the finger is set to 1 cm/0.1 sec. Then, if LED lighting time is 28 μsec, the movement of the finger in this period is 2.8 μm, and image blurring or a sampling error between the frames is 1/10 or lower of a maximum pixel size. Assuming that image overlapping is equivalent to minimum five pixels, the process is repeated for about 1.4 msec at 150 μm, and thus a frame rate is about 714 frames/sec. As a ϕread period is about 1.4 msec., a signal output frequency is about 8 MHz. If the LED lighting period is further shortened, an image sampling error can be reduced, and fingerprint reproducibility after image synthesis is high, whereby authentication accuracy can be increased.

If the sensor is driven based on the foregoing as an assumption to enable later-described image synthesis, it is possible to carry out satisfactory authentication even if the feature point extraction method is any one of the frequency analysis method, the image matching method and the relation method. It is only necessary to set a feature point extraction method or a frame speed in accordance with a purpose (necessary authentication accuracy).

As a method for detecting the fingerprint, in addition to the optical system for irradiating the finger with light and detecting the fingerprint by the optical sensor based on its reflected light or transmitted light (or scattered/transmitted light), there is a semiconductor sensor system for detecting the fingerprint by placing the finger on a semiconductor sensor such as a piezoelectric element, a capacitance detection element, a temperature detection element or the like, and detecting a pressure, a capacity, a temperature or the like. According to the present invention, any detection method can be used. However, since an image is picked up so that portions of a dynamic image are overlapped in the invention, the sensor 210 must have a faster reading speed compared with the finger moving speed.

Next, another embodiment of an image input apparatus of the present invention will be described. According to the embodiment, partial pixel reading is not carried out, but all pixel reading is compared with another to reduce a data overlap portion.

Figure 25:
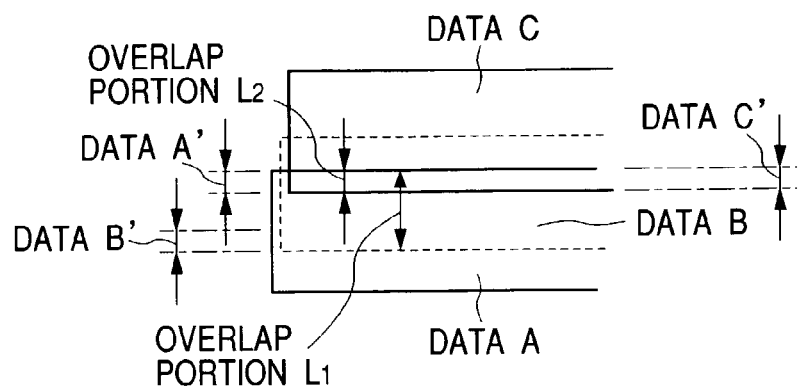
FIG. 25 is a view explaining a reading operation in the sensor.

FIG. 25 is a conceptual view of an operation of the embodiment. As shown in FIG. 25, first, data A is read by the sensor 210 on a first all pixel reading mode, and then data B is read by the sensor 210 on a second all pixel mode. Data B' of the data B obtained on the second all pixel reading mode and stored in the memory area 2 of the memory 213 is compared with data A' of the data A obtained on the first all pixel reading mode and stored in the memory area 1 of the memory 213 by the feature point comparison unit 214. If they do not coincide or do not coincide with each other substantially, as shown in FIG. 25, data C is subsequently read by the sensor 210 on a third all pixel reading mode. At this time, the data B is deleted from the memory 213. If the data coincide or substantially coincide with each other, the data B obtained on the second all pixel reading mode is used to compare its feature points with those of the data A obtained on the first all pixel reading mode by the feature point comparison unit 214 and, as in the case of the operation of the foregoing embodiment, fingerprint authentication is carried out.

Data C' of the data C obtained on the third all pixel reading mode and stored in the memory area 2 of the memory 213 is compared by the feature point comparison unit 214 with the data A' of the data A obtained on the first all pixel reading mode and stored in the memory area 1 of the memory 213. If they coincide or almost coincide with each other, the data C is set in a stored state in the memory area 2 of the memory 213, and next all pixel reading is carried out. The described data comparison in the all pixel reading is carried on until fingerprint data of the entire finger is read. In the operation of the present embodiment, an overlap portion L2 between the data A and the data C on the all pixel reading mode is small compared with an overlap portion L1 between the data A and the data B on the all pixel reading mode. Without using the data B, the overlap portion can be reduced even if a finger moving speed is low. Other operations are similar to those of the foregoing embodiment. Incidentally, in order to increase a processing speed, preferably, the data A' is set in the vicinity of the end of the data A, and the compared data B', C' are set in the vicinity of the head of the data B, C.

Figure 26:
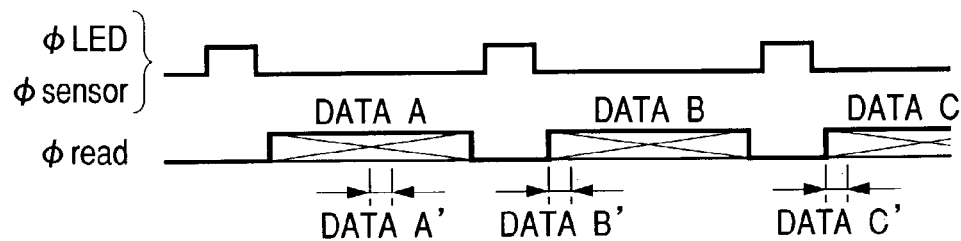
FIG. 26 is a timing chart showing an operation timing of the sensor.

FIG. 26 is a timing chart of the operation shown in FIG. 25. The data A is read by the sensor 210 on all the pixel reading mode, and then comparison is made to determine coincident or near coincidence of the data B' and the data C' of the data B and the data C obtained on all the pixel reading mode with the data A' of the data A (here, data C' coincides with the data A'). The data C having the coincident or almost coincident data C' is used, while the data B having the noncoincident or substantially noncoincident data B' is not used. Accordingly, the overlap portion is reduced.

Figure 27:
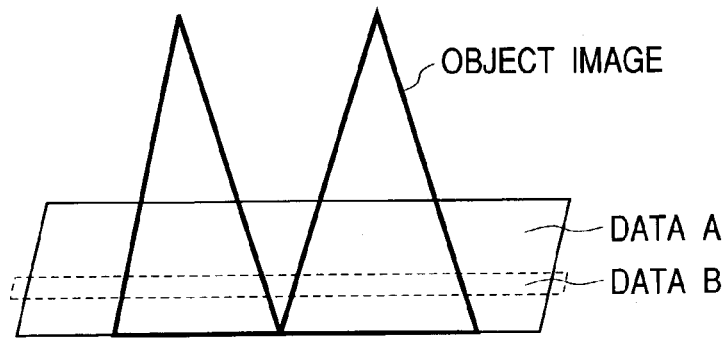
FIG. 27 is a schematic view showing image data when a character of an "M" shape to be recognized relatively easily is an object image.

FIG. 27 is an explanatory view showing image data when replacement is made to set a character of an "M" shape to be recognized relatively easily as an object image in the embodiment described above with reference to FIG. 19B. The data A is read by driving of all pixel reading, the data B is read by driving of next partial pixel reading, and a moving speed of the object is discriminated from a position of a pixel where the data A and the data B coincide with each other, whereby driving by next all pixel reading can be carried out.

Figure 28:
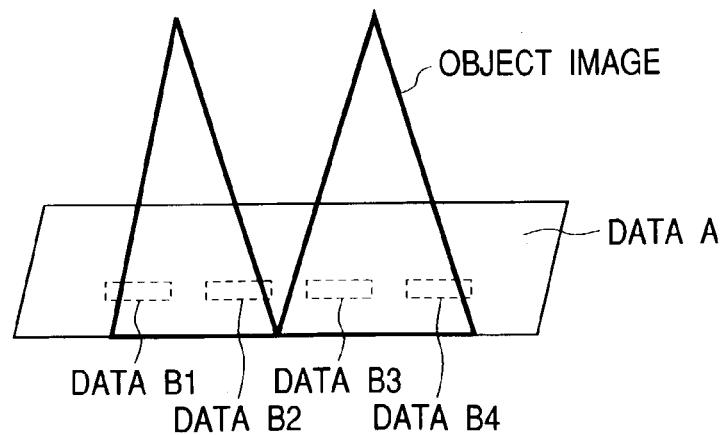
FIG. 28 is a schematic view showing image data when a character of an "M" shape to be recognized relatively easily is an object image.

As data of driving by all pixel data reading, only partial data of the data A may be used. FIG. 28 is an explanatory view showing image data when replacement is made to set a character of an "M" shape to be recognized relatively easily as an object image. As data of driving by all pixel reading, only partial data of the data A is used. In driving by next partial pixel reading, data B1, B2, B3, B4 of the data B are used to determine coincidence or near coincidence of the data A with the data B. In this case, there is an advantage of fast determination since next driving is carried out so as to read only a portion of pixel lines.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus for sequentially obtaining a plurality of partial images which are portions of an image of an object, by relatively moving the object and a sensor having a plurality of pixels, comprising:

a control circuit which controls a timing of obtaining data of the plurality of partial images to be synthesized, on the basis of comparison of the data of the plurality of partial images, wherein said control circuit includes a switch circuit which switches between a first reading mode for reading images from the plurality of pixels of said sensor and a second mode for reading images from a plurality of pixels smaller in number than the pixels used by the first mode, and a detection circuit which compares, for the object moved relatively to the sensor, a portion of the partial image data obtained by reading on the first reading mode with the partial image data obtained by reading on the subsequent second reading mode, and wherein in accordance with a result of the comparison by the detection circuit, the second reading mode is switched to the first reading mode by the switch circuit.

* * * * *

UNITED STATES PATENT AND TRADEMARK OFFICE
CERTIFICATE OF CORRECTION

PATENT NO. : 7,110,579 B2
APPLICATION NO. : 10/368578
DATED : September 19, 2006
INVENTOR(S) : Seiji Hashimoto It is certified that error appears in the above-identified patent and that said Letters Patent is hereby corrected as shown below:

ON THE TITLE PAGE, ITEM -30-
(30) Foreign Application Priority Data "Feb. 22, 2000 (JP)....2002/046475" should read -- Feb. 22, 2002 (JP)....2002/046475 --

COLUMN 1:
Line 26, "E commerce" should read -- E-commerce --; and
Line 46, "No. 3,198,810" should read -- No. 3198810 --.

COLUMN 2:
Lines 14 and 26, delete "an";
Line 26, "another," should read -- another --; and
Line 35, "is" should read -- are --.

COLUMN 4:
Line 36, "lines" should read -- line --; and
Line 52, "finger" should read -- finger is --.

COLUMN 6:
Line 46, "$M_{SF}$)" should read -- $M_{SF}$). --.

COLUMN 7:
Line 9, "this." should read -- this --.

COLUMN 8:
Line 9, "pixels" should read -- pixel --;
Line 29, "an" should read -- a --;
Line 34, "signal" (second occurrence) should read -- unit --; and
Line 67, "finger" should read -- finger is --.

COLUMN 9:
Line 35, "reads" should read -- read --.

COLUMN 11:
Line 56, "generator 35," should read -- generator 135, --.

COLUMN 14:
Line 5, "extent" should read -- extend --; and
Line 13, "sensor 212" should read -- sensor 210 --.

UNITED STATES PATENT AND TRADEMARK OFFICE
CERTIFICATE OF CORRECTION

PATENT NO. : 7,110,579 B2
APPLICATION NO. : 10/368578
DATED : September 19, 2006
INVENTOR(S) : Seiji Hashimoto It is certified that error appears in the above-identified patent and that said Letters Patent is hereby corrected as shown below:

COLUMN 15:
Line 55, "290" should read -- 218 --; and
Line 55, "finger" should read -- finger is --.

COLUMN 17:
Line 7, "Of" should read -- of --.

COLUMN 19:
Lines 30 and 33, "all the" should read -- the all --; and
Line 32, "coincident" should read -- coincidence --.

Signed and Sealed this

Twenty-ninth Day of May, 2007

JON W. DUDAS
*Director of the United States Patent and Trademark Office*